United States Patent [19]

Harper et al.

[11] Patent Number: 5,491,742
[45] Date of Patent: Feb. 13, 1996

[54] METHOD AND APPARATUS FOR PROVISIONING A PUBLIC SWITCHED TELEPHONE NETWORK

[75] Inventors: Myron E. Harper, Burtonsville; Sharon L. Robson, Silver Spring, both of Md.; Connie W. Combs, Leesburg, Va.

[73] Assignee: Bell Atlantic Network Services, Inc., Arlington, Va.

[21] Appl. No.: 376,201

[22] Filed: Jan. 20, 1995

Related U.S. Application Data

[63] Continuation-in-part of Ser. No. 152,360, Nov. 16, 1993, Pat. No. 5,416,833.

[51] Int. Cl.⁶ .................................................. H04M 3/42
[52] U.S. Cl. .................................... 379/201; 379/265
[58] Field of Search ........................... 379/201, 265, 379/211, 221, 67, 197, 230, 207

[56] References Cited

U.S. PATENT DOCUMENTS

| | | | |
|---|---|---|---|
| 4,232,199 | 11/1980 | Boatwright et al. | 379/197 |
| 4,782,517 | 11/1988 | Bernardis et al. | 379/201 |
| 4,782,519 | 11/1988 | Patel et al. | 379/221 |
| 5,012,511 | 4/1991 | Hanie et al. | 379/211 |
| 5,086,461 | 2/1992 | Thorn et al. | 379/230 |
| 5,222,125 | 6/1993 | Creswell et al. | 379/67 |
| 5,416,833 | 5/1995 | Harper et al. | 379/201 |

*Primary Examiner*—Jeffery A. Hofsass
*Assistant Examiner*—Scott Wolinsky
*Attorney, Agent, or Firm*—Lowe, Price, LeBlanc & Becker

[57] ABSTRACT

An administration system for a public switched telephone network (PSTN) includes a first automatic service order processing system which receives a service request from a customer requesting service. When the service request is eligible, the first automatic service order processing system automatically provisions first customer facilities to execute the service request based upon first information stored by the first automatic service order processing system, the first information including customer identification data and customer facility data. The first information is maintained by the first automatic service order processing system without altering the customer facility data when a disconnect request is received from the customer. When the service request is not eligible, the first automatic service order processing system generates a provisioning request. The administration system also includes a second automatic service order processing system which receives the provisioning request from the first automatic service order processing system and automatically provisions second customer facilities to execute the service request. The second automatic service order processing system is not required to maintain the customer facility data when a disconnect request is received from the customer.

10 Claims, 13 Drawing Sheets

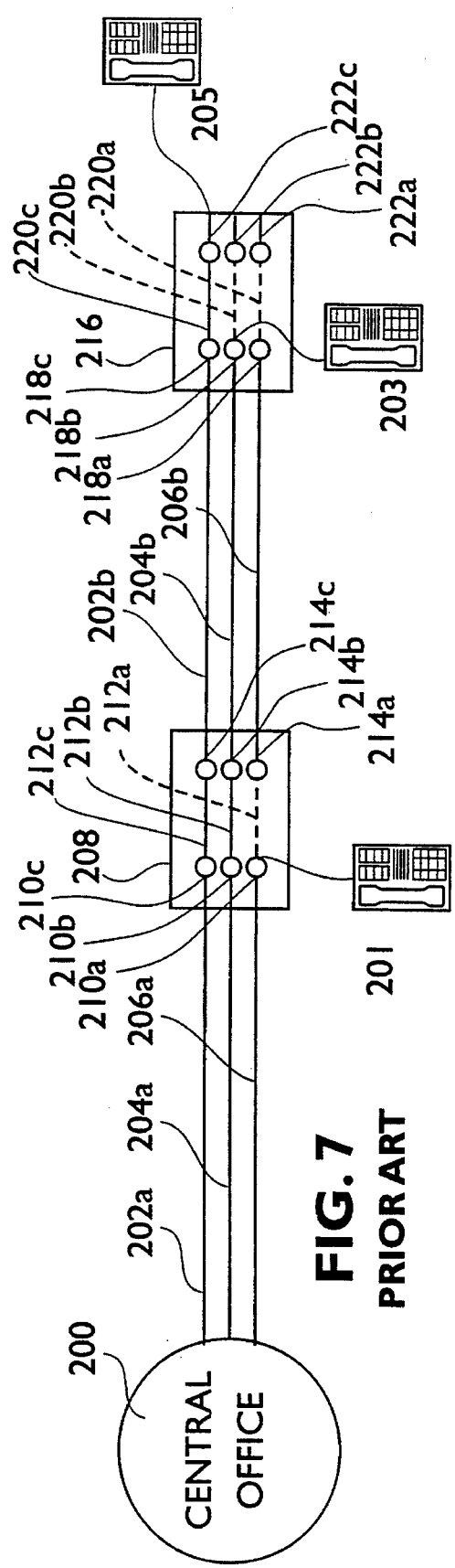
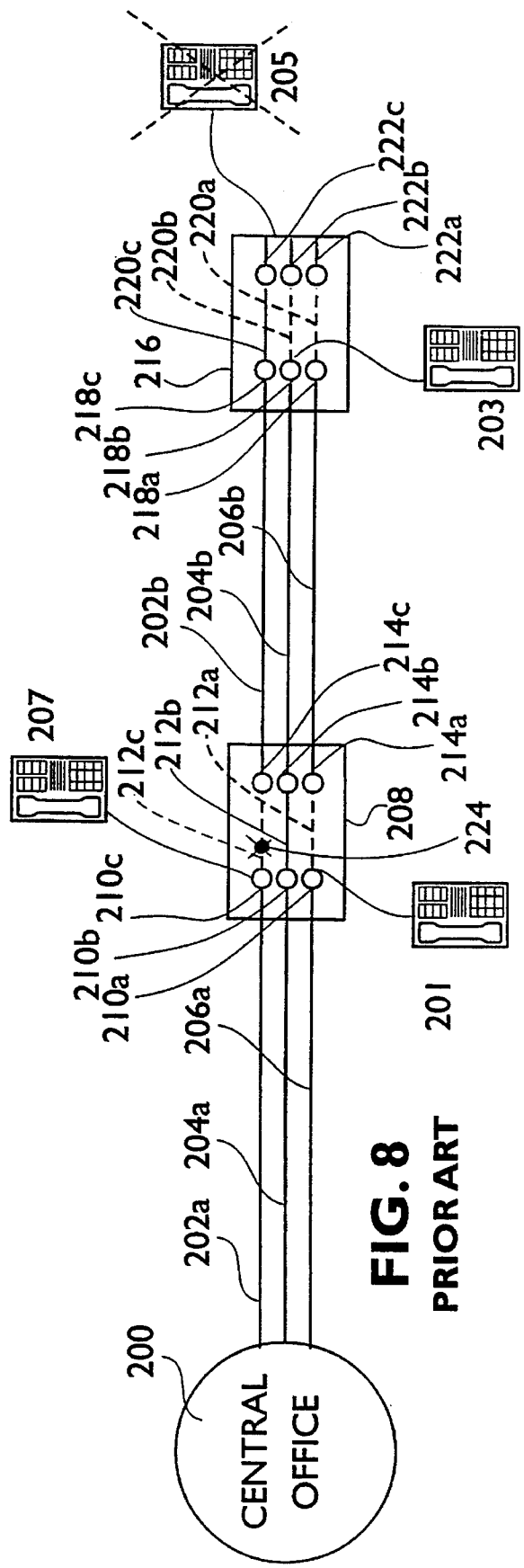
FIG. 7 PRIOR ART
FIG. 8 PRIOR ART

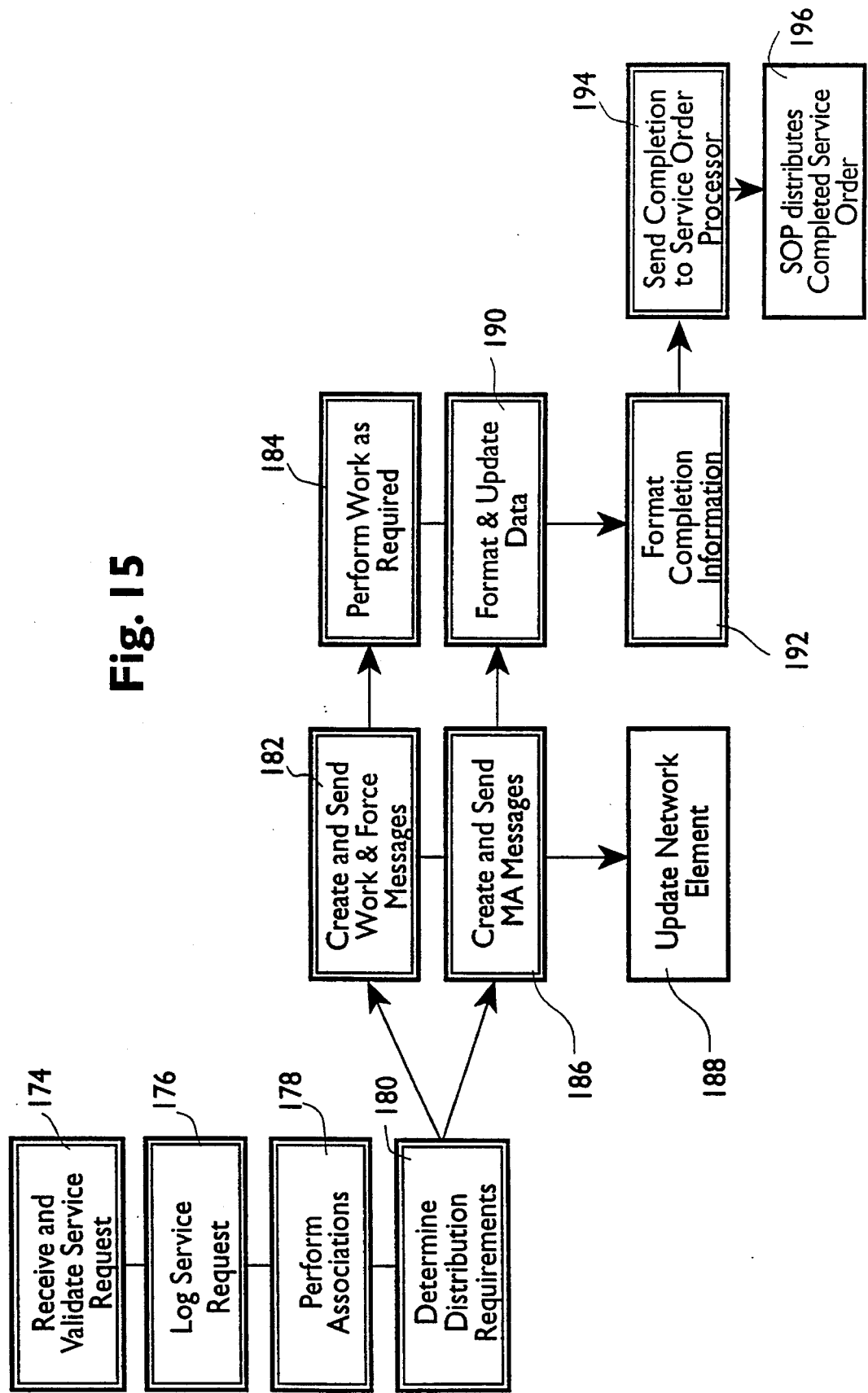

METHOD AND APPARATUS FOR PROVISIONING A PUBLIC SWITCHED TELEPHONE NETWORK

CROSS REFERENCE TO RELATED APPLICATION

This application is a continuation-in-part application of application Ser. No. 08/152,360, filed Nov. 16, 1993, now U.S. Pat. No. 5,416,833.

BACKGROUND OF THE INVENTION

1. Field of the Invention

This invention relates to public switched telephone networks (PSTNs) and more particularly relates to a method and apparatus for provisioning or administering such networks, such as, for example, activating service to a customer.

2. Description of the Prior Art

U.S. Pat. No. 4,782,517, issued Nov. 1, 1988 discloses a system that allows a user to provide new service to existing terminations in a telephone network. A server having program sequences for controlling its operation connects the terminations and the telephone network. The server monitors the occurrence of a request event at one of the terminations. A processor, distinct from the server, controls the server by accessing a directly accessible database to extract a state transition rule to provide control information corresponding to the response event. Information is returned to the terminations in response to the control information. The database storing the state transition rules is directly accessible by the user for changing the state transition rules to modify the services without changing the program sequences of the server.

U.S. Pat. No. 5,012,511, issued Apr. 30, 1991 discloses a system that provides special service in telephone networks, particularly with respect to call forwarding. An adjunct computer is associated with a Remote Memory Administration System (RMAS) for switches which include a facility for providing special services such as call forwarding. The adjunct computer is inserted between the RMAS and the switches which it controls and responds to a request for special services. The processor determines the identity of the subscriber station that is to receive the requested service and the nature of the service. A programming signal is generated and transmitted to the switch to which the station is connected.

U.S. Pat. No. 4,782,519, issued Nov. 1, 1988 discloses a method and apparatus for enhancing the operation of an existing central office in a telephone switching system to provide extended subscriber service. The system relates to existing central office equipment that is incapable of adequately providing "equal access" and other extended subscriber features to non-conforming central offices. The operating capabilities of these offices are enhanced so that they can offer extended subscriber features, such as equal access, without replacing or upgrading existing technology.

U.S. Pat. No. 5,086,461, issued Feb. 4, 1992 discloses a method and apparatus for providing switching equipment, such as lESS or 1AESS telephone switching office equipment which are stored program controlled switches, with the capability of controlling the connection management and disconnection of telephone circuits using Signaling System #7(SS7) protocols.

U.S. Pat. No. 4,232,199, issued Nov. 4, 1980 discloses a special services add-on specifically adapted for use in dial pulse activated switching offices such as a step by step office. The add-on is a stored program, processor based system that can be put on a line-by-line basis, independent of subscriber line assignments. The add-on provides special service such as incoming call alert, call conferencing, call forwarding, tone dialing abbreviated dialing, instant recall, etc.

FIG. 1 is diagram illustrating the basic structure or arrangement of the customer and telephone company facilities for providing telephone service or connection between a telephone caller and a telephone receiver destination. As illustrated in FIG. 1, telephone sets 1a, 1b, 1c, 1d, 1e represent different addresses or customer locations which receive and initiate telephone calls. In order for a customer location or address to establish or receive telephone service, each location or address must be physically connected to a central switching office or central office (CO) 3a, 3b, 3c via a physical copper cable pair or fiber optic cable. The cable pair which connects customer locations 1a, 1b, 1c, 1d, 1e often require intermediary connections via cross connect devices 2a, 2b, 2c, 2d and 2e. In this situation, there may be several legs of cable pairs 5a, 5b, 5c, 5d, 5e between cross connect devices 2a, 2b, 2c, 2d, 2e. The combinations of cable pairs which connect the customer location to the serving CO is commonly referred to as "outside plant". Central offices 3a, 3b, 3c are connected together via trunk lines 7a, 7b.

Once the customer location is connected to the CO via an in-coming frame at the CO 3a, 3b, 3c, the customer location must also be allocated office equipment (OE) which provide the specific calling features requested by the customer location. For example, the customer may request such features as call waiting or call forwarding which require different OE or different configurations of OE in CO 3a, 3b, 3c. Once the customer location is able to access the CO, the customer location may be connected via a CO to another customer location serviced by the same CO, such as customer location 1a calling customer location 1b which is connected or switched by CO 3a. Alternatively, the customer location may be connected to another customer location which is serviced by a different CO. For example, customer location 1c will be connected to customer location 1e via COs 3b and 3c, and cable trunk 7b.

The combination of outside plant and OE which is allocated or "provisioned" for a customer location is typically referred to as customer facilities which are always associated with the customer location until the customer location decides to disconnect service, e.g., the customer location moves from one calling area to another calling area. As clearly illustrated in FIG. 1, the arrangement of the outside plant and OE can become extremely complicated, particularly in view of the quantity of customer facilities which must be provisioned for each customer location. Further, the provisioning or assignment of customer facilities is further complicated with the typical or standard desire to conserve or reuse customer facilities as efficiently as possible. As will be discussed in detail below, we have discovered that this insistence on conserving customer facilities has resulted in excessive and unnecessary work which the present invention is directed at eliminating.

The current state of the art of provisioning of residential services to customers of PSTNs, i.e., customer facilities, follows a series of steps not conceptually different from the steps that were followed in a manual provisioning environment some thirty years ago. The individual work steps have been mechanized, and the mechanized steps have been connected with interfaces, but the steps have not basically changed. The common sequence of such steps is illustrated in FIG. 2. FIGS. 3–5 provide a more detailed flow chart illustration of this methodology. FIG. 6 shows system architecture.

Referring to FIG. 3 a Customer service representative of the Telco at 10 determines the reason for the call and the address of the caller or customer. The call may be for ordering service, making bill payment arrangements, registering a deposit, or calling for service maintenance. If the customer is calling for new service or a change to existing service the representative proceeds to the next step 12. Here the representative gathers the customer information such as the calling party's name, the customer's name, the service address, the billing name, and billing address. The representative determines how the customer wishes the service to be listed, the numbers and types of directories, calling cards, and any disclosures that are requested by the customer.

In the next step 14 the credit history of the customer is checked using internal and external data sources. At 16 the service representative takes the customer service address information provided and uses a PREMIS (Premis Information System) processor. PREMIS is an on-line address-based system used by service representatives for service order negotiation. It provides street address, Living Unit (LU), previous credit status, equal access carrier data, facility availability, and Telephone Number (TN) selection capabilities. PREMIS provides storage and retrieval of Street Address Guide (SAG) information, Living Unit (LU) information, Facility Assignment (FA) information, Telephone Number (TN) selection, repetitive debt customer information, and other information. At 16 the service representative uses PREMIS to verify the address, determine the working status of the address, and determines the serving wire center and other common address information such as community and tax codes. Based on the wire center serving the customer, the service representative is able to determine what services are available to the customer.

At 18 service is negotiated with the customer, matching the customer needs with the available products and services. The first service that is negotiated is basic service which will determine the calling plan for the customer. This is followed by the negotiation of toll services and other optional services such as touch tone, custom calling services and maintenance plans.

At 20 the due date for installation is negotiated and scheduled. At 22 a Telephone Number is selected from the PREMIS or Service Order Processor (SOP) systems. This Telephone Number will be based on the wire center serving the area and the availability of the TN.

Before ending the call with the customer, the service representative at 24 recaps the service request to insure that the customer order accurately reflects the customer's requirements. The service order is then issued or released at 26 to the SOP. The SOP checks the order for format accuracy and determines what centers or systems should receive the service order. The service order is then distributed to the systems and centers at 28.

Referring to FIG. 4 the service order is next received by the Service Order Analysis and Control System (SOAC).

The order is validated and checked for format accuracy 30. At 32 an initial determination is made for orders that might require manual work or testing. If the order might require work or testing a planning message is sent to the Work and Force Administration/Dispatch Out (WFA/DO) system at 33. WFA/DO system makes the final determination as to whether a dispatch or testing is required.

At 34 the Service Order Control system determines if loop facilities are required for the order. This is based on Universal Service Order Codes (USOC) and Field Identifiers (FID) on the order. If a loop facility is required an assignment request (AR) is prepared and sent to the Loop Facility Assignment and Control System (LFACS). This assignment request is made at 36 and contains the address, order number, telephone number, and date due. An outside plant equivalency code (OEC) is also sent in the request that has been determined based on the type of service. The OEC designates the type of facility required for the request.

At 38 the address is first matched with addresses in the Loop Facility inventory system. If there is an address match, the status of the living unit is checked to insure that there is not already working service at the address. The terminal address is then determined. Once the address and terminal address have been verified, a network facility matching the request is selected at 40. After the facility is selected the information in the form of an assignment request response (ARR) is sent back to the Service Order Control system at 42.

The Service Order Control system determines switch equipment requirements, prepares the request and sends an assignment request to the Switch Inventory system at 44. The assignment request is received by the Switch Inventory system from the Service Order Control system at 46. This request will contain information as to the type of switch facilities required, the loop facility that must be connected, the telephone number, the service order number, and the date due.

At 48 the loop facility and telephone number received in the assignment request are verified with the Switch Inventory system data. The status of each is checked to insure that the request can be completed as requested.

the switch equipment is selected at 50 based on the requested switch facility, the loading of the switch and the jumper length to be connected. The selection also will determine if an existing jumper has been left in place. Based on these criteria, switch equipment is selected. The switching equipment which is typically used involves a stored program control switch (SPC) such as a 1ESS or 1AESS switch.

After the selection of switch equipment, the information is sent to the Service Order Control system at 52. The Service Order Control system assembles the information received from the Loop Facility Inventory System and the Switch Inventory system at 54. This information is formatted as an assignment section and placed on the service order. The assigned Service Order (SO) is then sent to the SOP at 56. The SOP determines where the service order should be sent and distributes the service order at 58.

At 60 the Service Order Control system also sends the assigned service order to the Work and Force system. At 74 work is performed as required. That is, if other work in the field or in the central office is required, this work is completed and reported back to the appropriate center or system. Work may include placing jumpers in the central office or in the loop facilities, connecting the customer to the network and placing inside wiring and jacks at the customer premise.

After completion of the service request the completion information is sent to the SOP at 76. This information may include the completion time and date, any changes to the service order and any billing information that needs to be added for time and material charges.

The Service Order Control system determines if memory administration is involved in the request and if so determines if it has the required information to prepare a translation packet to send to the Memory Administration System (MAS) at 62. The translation packet is then created. If a translation packet cannot be prepared an image of the service order is prepared. The translation packet or the service order image is then sent to the Memory Administration System at 64.

The TP or SOI is received and validated in the Memory Administration System at 66.

The Memory Administration System validates the TP/SOI and determines what needs to be done to complete the request.

At 68 the Memory Administration System (MAS) creates a machine readable Recent Change (RC) message specific to the switch to receive the message. The Recent Change (RC) message is created to match the vendor specific switch type and generic. The RC message is then sent to the switch at a designated time at 70 and the switch is updated at 72.

Referring to FIG. 5, the SOP receives the completion information at 78 and prepares the completed service order for distribution at 80. At 82 the SOP determines the distribution of the service order and the completed service order is distributed to all systems requiring the information. Thus, as indicated at 84, the service order is sent to a number of systems including Loop Maintenance, Billing, Directory, and E-911. The service order is also sent back to the Service Order Control system at 86 to update the status of the facilities from Pending Connect or Disconnect to Working or some idle status. At 88 the Service Order Control system receives the completed service order and validates the format of the information.

The Service Order Control system determines the network requirements at 90. In this case, since the order is completed, the requirement is to change the status of the facilities from Pending Connect to Working. If the request was for a disconnect this would change from Pending Disconnect to Disconnected.

At 92 the Assignment Request is sent to the Loop Facility system. The Loop Facility system matches information received in Assignment Request with existing facility data and at 94 updates the status of the facility from Pending Connect to Working or from Pending Disconnect to Disconnected. At 96 an Assignment Request Response is sent to the Service Order Control system. At 98 switch facility requirements are determined. In this case, the requirement is to change the status of the facility from Pending Connect to Working or from Pending Disconnect to Disconnect.

At 100 an Assignment Request to the Switch Inventory system is sent to update the status of the facility and the Telephone Number. The Assignment Request is received from the Service Order Control system at 102 and the appropriate status changes are made. The status of the facility and the Telephone Number are changed. The Status Inventory system inventories and administers the use in aging of telephone numbers. When a telephone number is disconnected, it will be aged for a specified period of time before being reused. After the status of the switch facility and telephone number have been completed, a confirmation is sent to the Service Order Control system at 104.

Referring to FIG. 6 there is shown typical architecture for carrying out the above described methodology. The Service Order Processor (SOP) is shown at 106. The SOP obtains the information from the customer calling for service and obtains the previously described information from Premis Information System (PREMIS) 108 upon the SOP initiating a request to PREMIS. That information is put on the service order which goes from the SOP to the Facility Assignment Control System (FACS) 113 which is an automated facility assignment system which automatically assigns loop facilities and office equipment to a subscriber address to provide telephone service. This assignment of loop or outside plant facilities and office equipment is in response to the provisioning request or service order generated by SOP 106.

FACS is an automated facilities assignment system which attempts to optimize the use of loop facilities and office equipment including jumper cables to minimize the amount of unused inventory and cost to the telephone service provisioning company. FACS, an on-line computer system, administers, inventories, and assigns the complete circuit from the customer's premises to the local serving office. FACS is the primary automated support for the provisioning work group since it keeps track of all interconnections and segments (working and available). FACS works by maintaining inventories of outside plant (OSP) and central office (CO) facilities and using the data to make assignments. FACS is a collection of computer systems which have been previously discussed in connection with FIGS. 4–5, and which is further discussed in greater detail with respect to FIG. 6.

The first system in FACS 113 which receives the service order is the Service Order Analysis and Control system (SOAC) 110. SOAC is the controller of service order flow within FACS and handles most of the interfaces between FACS and other systems, such as the Service Order Processor (SOP). SOAC reads the assignment affecting sections of the service order line by line and determines if FACS can process the order. If the assignment requirements can be determined, FACS automatically assigns the service order. If SOAC reads a Field Identifier (FID) or Universal Service Order Code (USOC) that is beyond FACS' capability, the service order is sent to the service provisioning work center for manual intervention using perhaps LOMS. SOAC also detects errors that are routed back to the originator for correction.

If SOAC can completely interpret the service order, it builds Assignment Requests (ARs) which are sent to LFACS and WM/COSMOS or SWITCH to request outside plant facilities and central office facility assignments, respectively. After assignments are made, SOAC receives Assignment Request Responses (ARRs) from LFACS and WM/COSMOS, merges and formats this data into a service order assignment section and automatically returns it to the Service Order Processor (SOP).

SOAC tracks all service orders and Line and Station Transfers (LSTs) through completion or cancellation. Status information is maintained on all service requests as well as the service order image and relevant data that results from processing.

SOAC also includes the capability of supporting multiple SOACs residing on the same machine, different machines, or a combination of both. This capability is called SOAC Tandem. For orders that contain wire centers supported by more than one SOAC, SOAC Tandem provides tracking of all involved SOACs and the linking of assignment data generated by all involved SOACs. Hence, the SOP only needs to communicate with one SOAC for any multi-SOAC order.

A service order is sent to the appropriate SOAC by the SOP based on the header wire centers (for non-TFS involved orders) or the Circuit Administrative Area (for TFS involved orders). Note: TFS (Trunk Facility System) is a generic term for a system such as TIRKS. The particular SOAC that receives the service order determines other potentially involved SOACs based on the wire centers and/or NPA-NNXs appearing on the order. If there is more than one potentially involved SOAC, the SOAC that receives the order in the controlling SOAC for the order and the other potentially involved SOACs are called the subordinate SOACs.

Current SOAC processing takes place in each involved SOAC to generate the necessary assignments for the wire centers involved in the SOAC. Each involved SOAC sends it SOP status and assignment data to the controlling SOAC. The controlling SOAC tracks and sequences all responses sent back by all involved SOACs. When at least all solicited responses or any subsequent unsolicited responses have been received by the controlling SOAC, the controlling SOAC analyzes the statuses and determines the appropriate response (if any) to return to the SOP. Assignment data returned by involved SOACs is linked by the controlling SOAC before it is sent to the SOP. Besides communicating with the SOP, the controlling SOAC is also responsible for communicating with all other order level SOAC interfaces, such as TFS. SOAC also records the pass of a service order. The pass identifies the current phase of the order as determined by the service order issuance group. There are five pass types as described below:

1. Pre-completion (PRE)—The initial issuance of a service order.
2. Correction (COR)—A change to the initial service order prior to completion in the SOP.
3. Post Completion (PCN)—Notification that the service order has been completed without corrections in the SOP.
4. Completion with Correction (CPC)—A completion notice that identifies changes made to the service order at the time it was worked. This pass also completes the service order in the SOP. If a CPC pass is sent and SOAC detects that the changes may affect assignment, SOAC sends a notice to the service provisioning work center. IF necessary, the user updates the LFACS and/or COSMOS databases.
5. Cancellation (CAN) notification that the service order has been cancelled.

SOAC reads the changes on each new pass of a service order. If a COR pass is sent and changes are needed on the assignment, FACS attempts to automatically reassign the service with the necessary changes.

The service order is parsed out by SOAC and a determination is made as to whether there is a loop facility required for the order. An Assignment Request (AR) is made to the Loop Facility Assignment and Control System (LFACS) 112 where a loop facility is requested for the specified address. LFACS maintains a mechanized inventory of outside plant facilities, (e.g., facility addresses, cables, cable pairs, serving terminals, cross connection devices, loops, etc.) and assigns the outside plant facilities to ARs (Assignment Requests) received from SOAC as a result of customer service order activity. LFACS sends this assignment back to SOAC via ARRs. LFACS also generates work sheets for cable transfers and reconcentrations. These activities are updated mechanically upon notification of completion.

In addition, LFACS changes existing loop inventory with maintenance change activity and facility modifications via transactions input into the system by the user. Information once contained in Dedicated Plant Assignment Cards (DPAC) and Exchange Customer Cables Records (ECCR) for use in the manual assignment process is now maintained in an automated data base. As a consequence of assignment requests from the Service Order Analysis and Control (SOAC) system or inquiries from Loop Assignment Center (LAC) personnel, LFACS applies appropriate algorithms to information contained in the data base in order to provide appropriate responses.

The LFACS assignment process consists of two parts: the blocking function and the assignment function. The blocking function identifies the serving terminal. The automatic assignment function uses information provided by the blocking function in conjunction with an assignment algorithm appropriate for the type of service requested. The automatic assignment function can select reserved, connect-through, committed and spare pairs. Given that an assignment cannot be made in one of the above ways, a pair can be selected by breaking a connect-through which has remained idle for longer than a specified time period (overaged), performing a line and station transfer, breaking an underaged connect-through or some combination of these. The order of the selection of pairs is controlled by parameters specified at the terminal or wire center level. In addition to automatic processing, LFACS supports a capability which allows a user to manually select and assign any OSP facilities.

The LFACS administration of circuit terminations and facilities allows for single-loop single-line circuit terminations, multi-loop single-line circuit terminations, and multi-party circuit terminations with the use of appropriate bridging rules. Two or more circuit terminations may share a common facility (i.e., cross-box or field bridging).

LFACS supports the assignment and administration of multiple outside plant, dedicated outside plant, and serving area concept. This includes the specific types of hardware associated with each type of administration. The LFACS assignment function processes customer initiated inward, outward and change activity for circuit terminations.

SOAC matches the address from PREMIS to a possible address in LFACS. If a match is found it proceeds with processing by matching that to a terminal serving the address. It then begins to select a pair back to the central office. Once this is completed the Assignment Request Response (ARR) is sent back to SOAC and the loop part of the connection is fixed.

SOAC makes an assignment request to the Computer System for Mainframe Operations (COSMOS) 114 via Work Manager (WM) 116 or SWITCH 118. The WM links COSMOS to the other FACS components. Inquiries and transactions to COSMOS are sent through the WM which controls the load level of the message delivered to COSMOS. If COSMOS fails, the WM stores the ARs (Assignment Requests) generated by SOAC during the down time and distributes them to COSMOS when it is restored.

COSMOS maintains an inventory of central office facilities (e.g., office equipment (OE), tie pairs (TP), bridge lifters (BL), telephone numbers (TN). COSMOS assists the Network Administration (NAC) and Frame Control Centers (FCC) in managing, controlling, and utilizing main distributing frame and central office equipment, facilities, and circuits. The system performs preferential assignment of line equipment, frame jumper reuse, tie pair management for Plain Old Telephone Service (POTS), frame work management and includes extensive reporting capabilities.

COSMOS receives ARs from SOAC after a successful LFACS assignment and automatically assigns line equipment and certain miscellaneous central office equipment. COSMOS responds back to SOAC with ARRs. Cable transfers and reconcentrations generated by LFACS are automatically established in COSMOS. These transactions can be manually input into COSMOS if necessary.

The SWITCH system is an operations system to inventory and assign central office switching equipment and related facilities. It allows companies to provision, efficiently and economically, a network that is comprised of both digital and analog technologies. The SWITCH system provides improved computing methodology and a new database structure to support quick incorporation of new technological developments and to accommodate differences in technology between vendors. The SWITCH system will support digital and other new technologies/services in a single, integrated, flow-through provisioning system. In particular, the SWITCH system is designed to handle ISDN inventory and assignment requirements, and to facilitate ISDN flow-through provisioning. The SWITCH system is also designed to support inventory and flow-through assignment capabilities as appropriate for digital overlay networks and integrated digital facilities.

The SWITCH system will provide integrated inventory and flow-through assignment control for circuit switches, packet switches, ISDN switches, derived channel technologies, and for any associated transmission equipment and intra-office facilities (e.g., tie pairs) required to support the provisioning of these switches and technologies. SWITCH is designed to support integrated line and trunk side provisioning requirements and will ultimately replace and expand both COSMOS and TAS functionality.

COSMOS or SWITCH takes the facility that it obtained from LFACS and tries to find a match. Also PREMIS selects a Telephone Number and COSMOS attempts to match the facility, the F1 facility, and the Telephone Number. If a match is secured it assigns office equipment.

After SOAC gets the service order and determines what to do and sends the assignment request to LFACS, it sends a planning message to the Work and Force Administration/Dispatch Out (WFA/DO) 120 and provides notification that there is a need to make a determination if there is any outside work to be done. After the assignment request response has come back from COSMOS, information is sent to Memory Administration Check System (MARCH) 122 for memory administration work and it is also sent to the Remote Intelligent Distribution Element Support System (RIDES) 124 which handles the fiber electronics, if required. A Work Manager (WM) 126 is disposed between SOAC and MARCH. After the assigned service order is received at WFA/DO a mechanized loop test is initiated by the Loop Maintenance Operation System (LMOS) 128. After the service is completed, the LMOS host 130 will receive a completed service order for record maintenance.

Service orders that do not automatically flow through the provisioning process fall out of automatic processing and are managed by the LAC Operations Management System (LOMS) 132. LOMS assists the Mechanized Loop Assignment Center (MLAC) in management of Requests for Manual Assistance (RMAs). The primary function of LOMS includes the creation of work packages for assignment personnel and monitoring the flow of orders through FACS and the service provisioning work group. This state of the art provisioning process may require up to two days to complete.

Two important work centers interface with FACS. These work groups are the Frame Control Center (FCC), and the Installation Control Center (ICC).

The FCC is responsible for the administrative, force control, work control, and analysis functions associated with the installation and maintenance of cross-connects of loop, special service, carrier, and message trunk circuits and their associated activities in central offices. The center is responsible or providing related order status and work completion information to the support systems, COSMOS and the TIRKS system, or to Order or Circuit Control Centers. The centers will also be responsible for the support of facility maintenance, sectionalization and/or substitution of facilities in connection with failures detected by routing testing or customer complaints.

The ICC has responsibility for and performs the administrative functions associated with work activities including:

Installation Force Management,

Order tracking,

Work assignment and dispatch,

Field-force coordination and progress tracking,

Force planning,

Prepost completion dispatch testing, and

Completion notification to the service order centers and to the customer when required.

The ICC performs these functions for installation work groups, which are the field forces responsible for installation of the service drop, protector, network channel terminating equipment, network terminating work, and network interface. The ICC interfaces with FACS through WFA/DO the Work and Force Administration/Dispatch-out system. This interface is optional and is not installed in all companies. Where WFA/DO and its interface to FACS do not exist, the ICC gets its information from FACS as a function of the normal service order flow. The WFA/DO interface speeds the process and provides additional automation to assist the work in the ICC.

As discussed above, FACS is designed to optimize the assignment or provisioning of customer facilities. Accordingly, FACS will often reuse customer facilities in order to achieve the main objectives of FACS which is to conserve customer facilities, i.e., outside plant or OE. FIG. 7 is a detailed diagram of outside plant facilities for a first combination of customer locations. As illustrated in FIG. 7, customer locations 201, 203, 205 are connected to central office 200 via different combinations of outside plant facilities including cable pairs 202a, 204a, 206a and cable pairs 202b, 204b, 204c via cross connect devices 208 and 210. Customer location 201 is connected to CO 200 via cable pair 206a and terminal 210a in cross connect device 208. Customer location 203 is connected to CO 200 via cable pair 204a and cable pair 204b by connecting cable 212b which connects terminals 210b and 214b in cross connect device 208, and terminal 218b in cross connect device 216. Finally, customer location 205 is connected to CO 200 via cable pair 202a and 202b by connecting cable 212c which connects terminals 210c and 214c in cross connect device 208, and cable 220c which connects terminals 218c and 222c in cross connect device 216. As can be seen, multiple cable pairs are installed or positioned along the area of customer locations 201,203,205, and not all of the cable pairs are utilized. This type of arrangement of outside plant facilitates the adaptability of outside plant to changing conditions of the various customer locations in the area of cross connect devices 208, 216.

FIG. 8 is a detailed diagram of outside plant facilities for a second combination of customer locations which has altered the first combination of customer locations. In FIG. 8, customer location 205 has been disconnected via a disconnect request executed by the Business Office and entered via a disconnect service order in the SOP. During the same relevant time period, a new service request has been initiated by customer 207 at the Business Office and entered via a new connect service order in the SOP.

Both the disconnect and new connect service orders are transmitted to SOAC which sends each of the requests to LFACS for outside plant provisioning. Since, as indicated above, LFACS will attempt to optimize outside plant facilities by minimizing the outlay of new cable pairs and reuse of existing outside plant facilities, LFACS will often break the existing connection 212c in cross connect device 208 at 224, and reassign terminal 210c to the new customer location 207. A work order is then issued for an installer to make the appropriate changes to the outside plant facilities.

FIG. 9 is a detailed diagram of office equipment facilities for a first combination of customer locations. In FIG. 9, stored programmed control switch 230 will connect incoming telephone calls to destinations by connecting the incoming call to, for example, different central office frames which will be described. For example, an incoming telephone call may arrive in the central office in frame 246c at frame location 248c. Frames 246a, 246b, 246c, 246d may be located at a first floor are a 245 of the central office building.

The incoming call is then transferred to frame location 242c in frame 240c bearing the office equipment used to provide the specific calling features requested by the customer location. Frames 240a, 240b, 240c may be located at a seperate floor area of 241 the central office. The cables 244a, 244b, 244c which connect frames 246a, 246b, 246c, 246d to frames 240a, 240b, 240c are commonly referred to as "jumper" cables. Frames 240a, 240b, 240c are then connected to switch 230 at switch connections 236a, 236b, 236c via cables 238a, 238b, 238c. From switch connections 236a, 236b, 236c, the incoming call may be transferred to another customer location or to another central office via, for example, trunk frame 235 at location 234 from switch location 232. Stored programmed control switch 230 and trunk frame 235 maybe located an the same floor or on a different floor than floor areas 241 and 245.

FIG. 10 is a detailed diagram of office equipment facilities for a second combination of customer locations which has altered the first combination of customer locations. In FIG. 10, a first customer location which utilized the OE on frame 246b at location 248b has been disconnected via a disconnect request executed by the Business Office and entered via a disconnect service order in the SOP. During the same relevant time period, a new service request has been initiated by another customer at the Business Office and entered via a new connect service order in the SOP. The second customer has been provisioned on frame 246b at location 254.

Both the disconnect and new connect service orders are transmitted to SOAC which sends each of the requests to COSMOS or SWITCH for office equipment provisioning, depending on the particular type of stored programmable switching equipment. Since, as indicated above, COSMOS or SWITCH will attempt to optimize office equipment facilities by minimizing the use of new office equipment, minimize the length of jumpers between frames, and reuse existing office equipment facilities, COSMOS or SWITCH will often not reuse the existing connection 244b at 250, and reassign a new jumper cable 252 for the second customer location. A work order is then issued to the central office for frame installers to make the appropriate changes to the office equipment facilities.

FIG. 11 is a detailed diagram of office equipment facilities for a first combination of customer locations. FIG. 11 illustrates the various connections within a frame at the central office. In FIG. 11, frame 254 connects three customer locations at entrance points 256a, 256b, 256c to office equipment connected to out going frame locations 260a, 260b, 260c via jumper cables 258a, 258b, 258c. Jumper cables 258a, 258b, 258c are to some extent disorganized, and longer than necessary, thereby inefficiently utilizing jumper cable facilities.

In order to correct the problem of inefficient allocation or provisioning of jumper cables, COSMOS or SWITCH in the FACS provisioning system will reorganize the jumper cables as illustrated in FIG. 12. Thus, frame 254 will connect customer entrance points 262a, 262b, 262c to office equipment accessed by cables 266a, 266b, 266c via jumpers 264a, 264b, 264c, thereby minimizing the jumper length and conserving use of the jumper cables. Accordingly, a frame installer will be dispatched to make the necessary changes to frame 254.

While the above goals of maximizing reuse of customer facilities including outside plant facilities and office equipment facilities has been a long standing and traditional objective or goal of all telephone companies for over one hundred years, we have discovered that the benefits of reusing customer facilities are not sufficient to outweigh the disadvantages of requiring installers to be dispatched to make the necessary alterations to customer facilities.

In addition, we have discovered that in the overwhelming majority of situations, when a customer location disconnects telephone service, for example, when a customer is moving to a different location, another customer will typically move into the previous customer location and request new telephone service which is typically compatible with the previous customer facilities.

We have further discovered that it is more beneficial to maintain the existing connections to customer facilities for a particular customer location, since it is likely another customer will move into the disconnected customer location in the near future, thereby eliminating the need to dispatch installers to install outside plant or office equipment facilities.

SUMMARY OF INVENTION

It is a feature and advantage of the present invention to maintain the existing connections to customer facilities for a particular customer location, since it is likely another customer will move into the disconnected customer location in the near future, thereby eliminating the need to dispatch installers to install outside plant or office equipment facilities.

Previous efforts to reduce provisioning costs and improve provisioning services have focused on improving the flow of work through the existing provisioning steps which have been described. This approach seeks to improve an underlying process that was developed to support provisioning in an analog copper facilities environment. In essence it seeks to improve flow-through. In contrast to this, the present invention is intended to provide an essentially no-flow paradigm where most service requests move directly from service negotiation to service activation without going through current largely unnecessary assignment processes. The system of the invention fully supports provisioning of services and also facilitates future enhancements to support provisioning of video-on-demand (VOD), ISDN and other advanced services.

The objects of the invention include reducing the operating cost of provisioning business functions, such as Install Inside and Install Outside; increasing the reliability of providing on-time, error-free service by reducing the number of orders that require manual assistance; increasing the flexibility of the provisioning process to support the activation of a new product or service quickly and inexpensively;

enhancing customer service and customer retention by providing faster access to all products and services; providing a strong long-term information infrastructure that meets the needs of the existing products and provides a foundation that can handle the requirements of new products.

According to the present invention there is provided a Ready-To-Serve (RTS) Adjunct Processor (AP) and associated storage which eliminates the flow of orders through the multiple current systems described above. Because the service activation process is totally re-engineered, service orders may be eliminated. This is accomplished through an integrated inventory management approach which dramatically decreases network churn. This approach permits the elimination of PREMIS and allows the RTS processor to control TNs and addresses and to effect a greater degree of communication with the Memory Administration Systems.

According to the invention there is provided in an administration system for a public switched telephone network which includes an attendant station for receiving service requests and collecting customer information, credit verification means, service order processing (SOP) means for creating and distributing service orders for processing by downstream processing systems such as Service Order Analysis and Control (SOAC) means, a Computer System for Mainframe Operations (COSMOS) means, SWITCH means, and Loop Facility Assignment and Control System (LFACS) means; and Adjunct Processor (AP) means having storage for storing data including Living Unit (LU) data, network facility data and Telephone Number (TN) data; and using such system to provide service implementation through the steps of:

receiving at the attendant station a request for service;

determining the reason for the request and customer information including customer name and service address;

checking credit;

using the customer information to determine from the AP the facility and services available;

selecting a TN from the AP;

recapping the service request with the customer;

determining if the service request is eligible for handling by the AP;

if not eligible, issuing a service order;

if eligible, initiating processing by the AP;

determining in the AP whether Work and Force Administration (WFA) action is necessary, and if so, preparing and dispatching a message to WFA;

determining in the AP whether a Memory Administration System (MAS) is involved and, if so, creating a Translation Packet (TP) and sending the TP to the MAS;

creating a Recent Change (RC) message in response to the TP and dispatching the message to the switch;

updating the data in the AP in response to confirmation of completion of the WFA action and the switch translation;

generating and dispatching a completion message from the AP to the SOP; and preparing a completed service order for distribution and distributing the same.

In another aspect of the present invention, an administration system for a public switched telephone network (PSTN) includes a first automatic service order processing system which receives a service request from a customer requesting service. When the service request is eligible, the first automatic service order processing system automatically provisions first customer facilities to execute the service request based upon first information stored by the first automatic service order processing system, the first information including customer identification data and customer facility data. The first information is maintained by the first automatic service order processing system without altering the customer facility data when a disconnect request is received from the customer. When the service request is not eligible, the first automatic service order processing system generates a provisioning request. The administration system also includes a second automatic service order processing system operatively connected to the first automatic service order processing system. The second automatic service order processing system receives the provisioning request from the first automatic service order processing system and automatically provisions second customer facilities to execute the service request. The second automatic service order processing system is not required to maintain the customer facility data when a disconnect request is received from the customer.

The present invention also features an administration method for a public switched telephone network (PSTN) including an attendant station for receiving service requests. The method includes receiving a service request from a customer at a living unit requesting service, and determining whether the living unit had previously been equipped with customer facilities for service. When the living unit has not been previously equipped with the customer facilities, the method includes automatically provisioning customer equipment to execute the service request based upon information including customer identification data and customer facilities. The information is maintained without altering the customer facilities when a subsequent disconnect request is received from the customer. When the living unit has been previously equipped with the customer facilities, the method includes determining whether the service request corresponding to a living unit is eligible for provisioning using the customer facilities previously utilized by the living unit. When the service request is eligible, the method includes automatically provisioning the customer equipment to execute the service request based upon the information including the customer identification data and the customer facilities previously used at the living unit.

BRIEF DESCRIPTION OF DRAWINGS

FIG. 7 is a detailed diagram of (prior art) outside plant facilities for a first combination of customer locations.

FIG. 8 is a detailed diagram (prior art) of outside plant facilities for a second combination of customer locations which has altered the first combination of customer locations.

FIGS. 14 and 15 are flow-charts illustrating the methodology of the system of the invention in performing service activation.

BEST MODE FOR PRACTICING THE INVENTION

Figure 13:
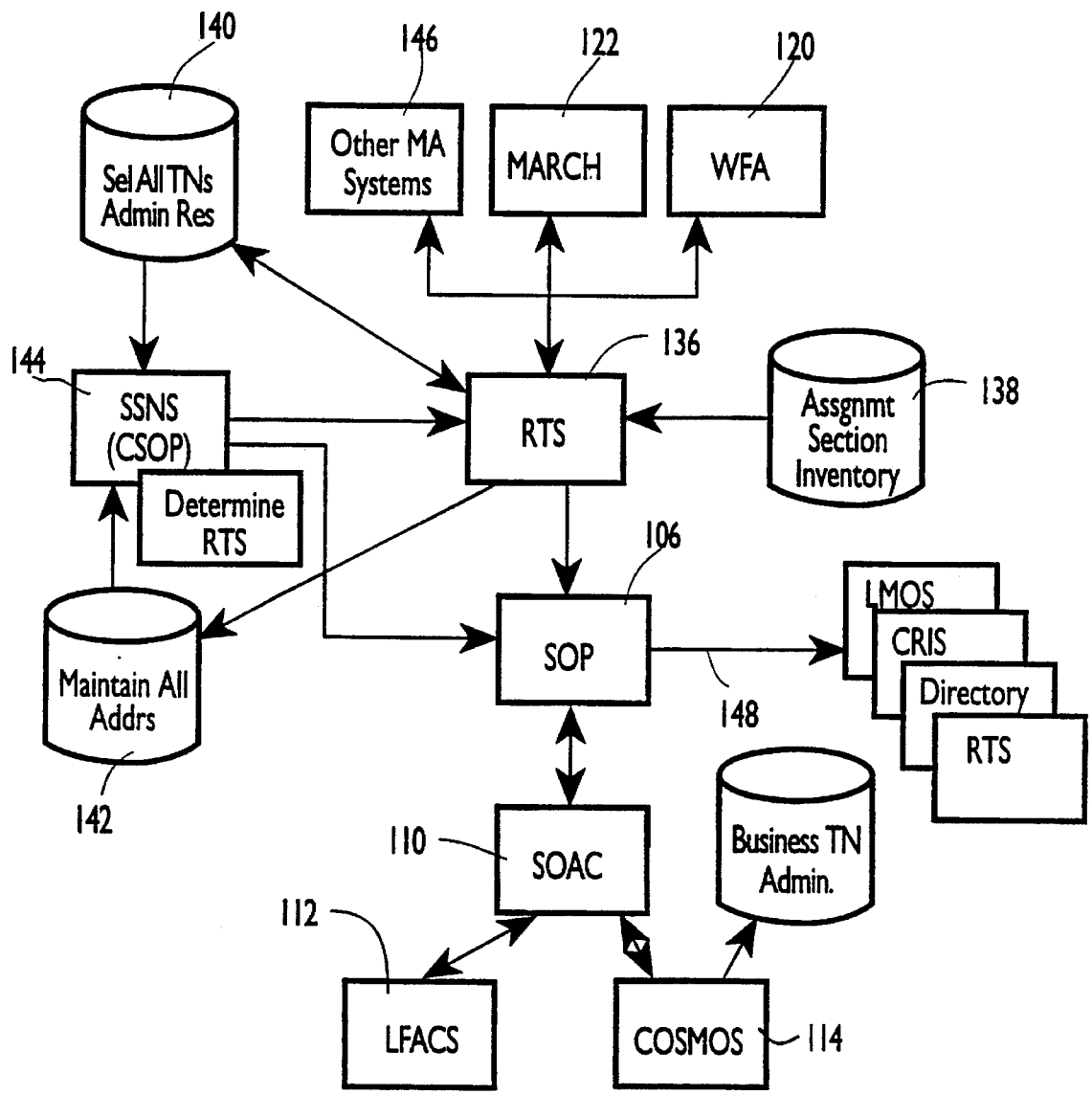
FIG. 13 is a block diagram illustrating the architecture of the preferred embodiment of the invention for administration of a PSTN.

Referring to FIG. 13 there is shown a block diagram of the architecture of the system used in implementing the preferred embodiment of the invention. The Ready-To-Serve (RTS) Adjunct Processor (AP) is indicated at 136 and includes storages or memories 138, 140 and 142. While these memories are illustrated as separate items it will be understood that a single storage may be utilized and is preferred. The RTS is connected to the Sales Service Negotiation System (SSNS) and Common Service Order Processor (CSOP) 144. The SSNS comprises a graphical user interface system that presents information to service representatives from a variety of systems and platforms in a window format to assist negotiation of services and inquiries. The CSOP translates service requests from SSNS into service order format and reverts.

The RTS processor and its storage or memories store an inventory of data which includes address information, network facility data and Telephone Number data. Addresses are associated with specific network facility data that will serve the address. Customers are associated with the address being served by the network. Included in the customer information is the Telephone Number of the customer and the type of service which is provided. Customer data also includes information concerning the current and previous customers, service, and status of each.

In general the RTS builds, maintains, and deletes information about the Living Unit (LU) address. This information is provided as required for the service negotiation process and is used in the processing of service activation requests. The customer information associated with the LU address supports access to customer data which includes existing and former customer names, class of service, telephone number, status of the Zine, and disconnect reason.

The RTS validates address information provided by the customer at the time of service negotiation for a service request and provides all LU information associated with the address to the service negotiator. RTS provides capability to search by partial or full address, customer name, and telephone number. RTS contains all LU addresses regardless of the existing service type including both residential and business addresses. RTS LU databases are initially compiled from a combination of available data sources including PREMIS, LFACS, CRIS (Customer Records Information System), LMOS, and 911.

In general RTS builds, maintains, and deletes information common to a range of addresses. These ranges are modifiable for specific addresses within an area. This information is provided as required for the service negotiation process along with LU information and is used in the processing of service activation requests. The information is currently referred to as Street Address Guide (SAG) information and is contained in the existing PREMIS database. The RTS also builds, maintains, and deletes information about the Facility Information serving a LU address. This information is provided as required to the service negotiation process for use in the processing of service activation requests and in providing assignment data to other downstream systems.

The RTS Facility Information includes living units specific facility information. This facility information includes outside and central office facility data normally listed on the service order, such as: Outside facility data-cable and pair for F1, F2, FN; terminal addresses for distribution and feeder; status; and central office facility data; F1 cable and pair location; Office Equipment (OE) and location and status.

The RTS provides capability to search by facility data and provide facility information and status. The RTS maintains a real-time view of the network facilities inventoried in LFACS and COSMOS. RTS performs updates to the facility data resulting in activity from the facility inventory systems including LFACS and COSMOS/SWITCH. These may result from network rearrangements in the form of Engineering Work Orders, maintenance changes, database reconciliations and other service order activity.

RTS also stores and maintains telephone numbers for all residential services and small business services. These are administered in RTS which controls the status and aging of such telephone numbers. Telephone numbers will be provided as required to the service negotiation process, for use in the processing of service activation requests, and in providing to other downstream systems. RTS has the capability to define, assign and change the status of a telephone number and will age residential and small business telephone numbers and make them available for reassignment after proper aging. RTS updates the telephone number database as a result of customer service requests, database reconciliations with other systems, and changes initiated by other inventory systems. The telephone number database is built from existing sources including COSMOS/SWITCH, LFACS, and Customer Records Information System (CRIS), which is the billing system for exchange services.

RTS stores and maintains an association for the Access Path. This association relates a specific LU address to a specific outside facility and office equipment and has a related customer and telephone number. RTS maintains a real-time view of the network facilities inventoried in LFACS and COSMOS. RTS performs updates to the Access Path data due to changes in LFACS and COSMOS/ SWITCH. While RTS has the capabilities to alter various data associated with a customer address, it is the goal of RTS to maintain the network or customer facility assignments in tact, under all circumstances for which RTS is applicable. Accordingly, the service request is first transmitted to RTS to determine whether the same facilities can be provisioned to the customer, without optimizing outside plant and office equipment facilities which would be performed by LFACS, SWITCH and COSMOS. RTS, therefore, eliminates the potential reworking or re-assignment of customer facilities under most circumstances which LFACS, COSMOS and SWITCH will attempt for each service order request. Thus, RTS minimizes the amount of unnecessary installation work with the realization that the customer facility assignments may not be optimal.

In service request processing RTS has the ability to search by address, telephone number, customer name or SSN. RTS assigns a unique identifier to each service request which allows users and other systems to track and inquire about specific service requests. RTS also extracts service request data relevant to RTS processing and determines if a service request is RTS eligible or if the request must be sent to a Service Order Processor for processing.

RTS provides an interface to implement interaction between facilities and the Service Request. Thus, RTS determines if the service request requires dispatch for customer premises work and, if so, creates data packets containing service request information which are sent to WFA/DO.

RTS determines if an Activation Message is required for the Service Request and the Memory Administration Systems involved. RTS then creates and distributes activation messages to the various Memory Administration Systems. RTS also interfaces with MARCH to send activation messages and receive acknowledgement of work completed or error in processing.

RTS receives requests from other systems both in real time and batch modes. These systems include SSNS (Sales Service Negotiation System), SOP, EAMI (Exchange Access Mechanized Input) for processing Primary Interexchange Carrier (PIC) orders, and ASTR (Automatic Suspension Termination Referral) for processing Suspension, Denial, Restoral and Disconnect orders.

RTS has the functionality to alter and manage distributions depending on the type of service request. Thus, RTS transmits data to SOP, WFA/DO, MARCH and the other Memory Administration Systems as required. RTS receives facility status requests from inventory systems and transmits the facility status back to the requesting system.

RTS provides reports of various types including reports detailing information regarding the RTS data inventory, the volume of information processed by RTS, capacity available, time of processing requests of different types, and number of requests processed.

In order for RTS to accomplish the foregoing certain existing elements in the system are modified. Thus, SSNS is modified to interface with RTS for address, TN, customer, and service request information. LFACS and COSMOS status facilities as RTS, LFACS and COSMOS work without the current working/idle facility status. COSMOS loads business TNs into RTS. WFA/DO interfaces with RTS for dispatch requests and confirmations. RTS interfaces with MARCH for activation messages and configurations. RTS distributes to the other MA systems. SOP accepts an order from SSNS. SOP must also be able to accept the completion trigger from RTS and match it with a service order in its pending files.

As seen in FIG. 13, RTS 136 is also linked to other elements of the system including MARCH 122, WFA 120, SOP 106, SOAC 110, LFACS 112, COSMOS 114, and other MA systems 146. A link to a third net and its connected elements is provided at 148. SOP 106 is linked to SOAC at 110 for handling those requests which are not RTS eligible.

The method of operation of this preferred embodiment of the invention is now described in connection with the flow chart in FIGS. 7 and 8.

Figure 14:
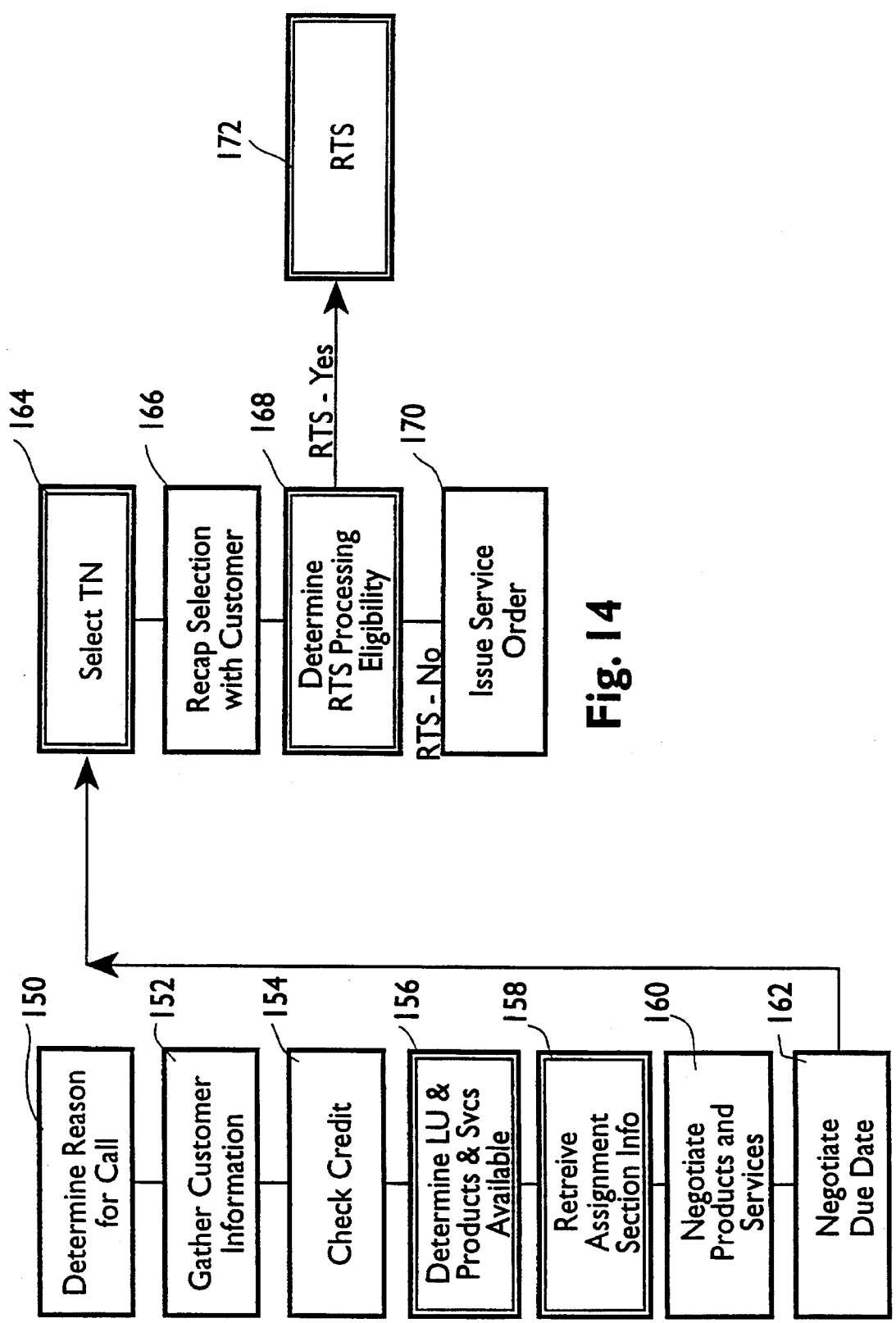

Referring to FIG. 14, at 150 the customer service representative determines the customer's address and the reason for the call. This may be for ordering service, making bill payment arrangements, registering a deposit, or calling for service maintenance. The call is handled or transferred according to need. If the customer is calling for new service or a change to existing service, the process proceeds to 152.

At 152 the customer service representative gathers the necessary information including the name of the calling party, the name of the customer, and the service address. If this is a new customer, the service representative may also obtain employment history, date of birth, SSN, and previous address information. The billing name and address is determined if different from the service address. The representative also ascertains how the customer wishes there service to be listed, the numbers and types of directories, calling cards, and any disclosures that are required.

Figure 1:
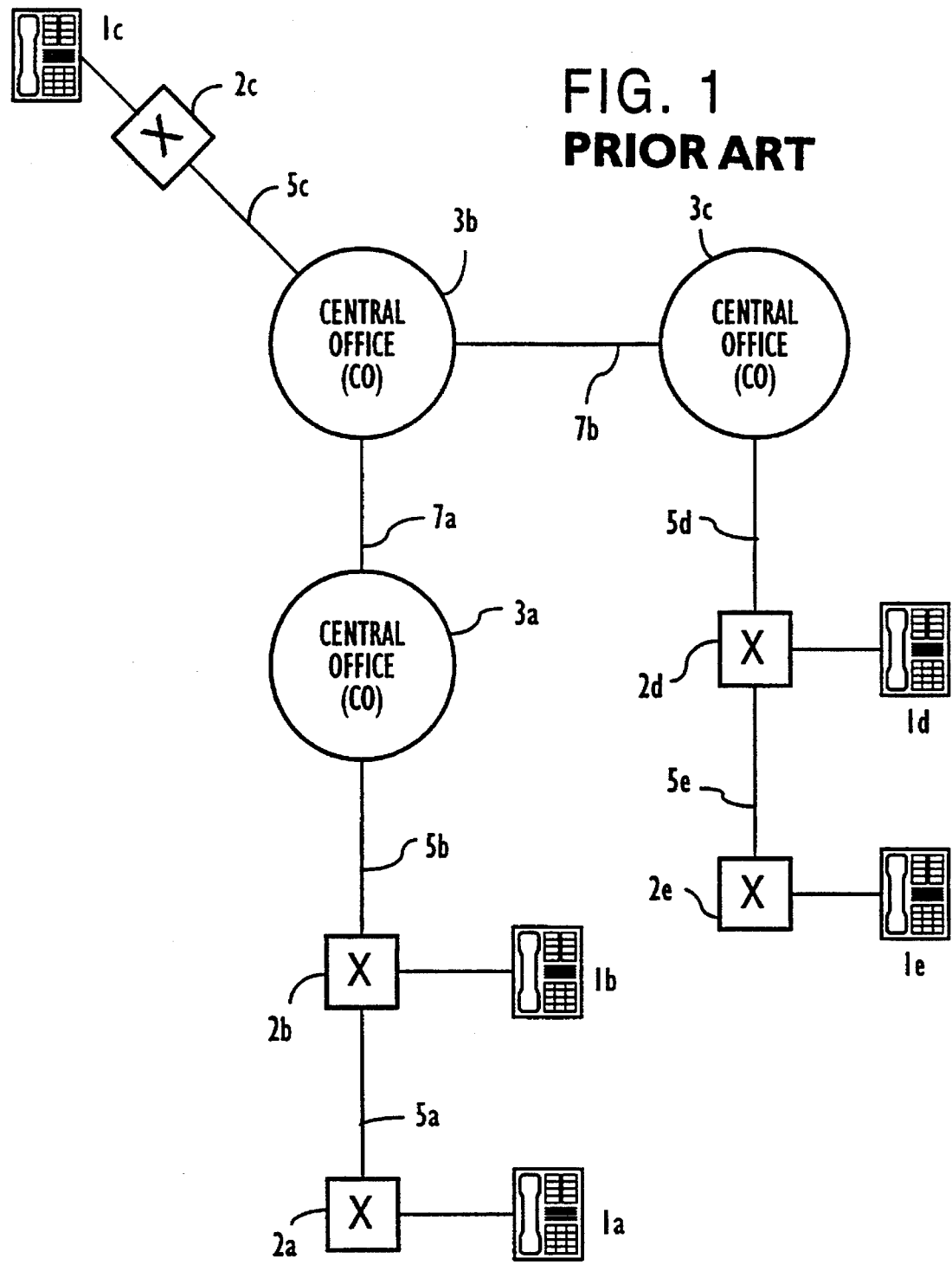
FIG. 1 is diagram illustrating the basic structure or arrangement (prior art) of the customer and telephone company facilities for providing telephone service or connection between a telephone caller and a telephone receiver destination.
Figure 2:
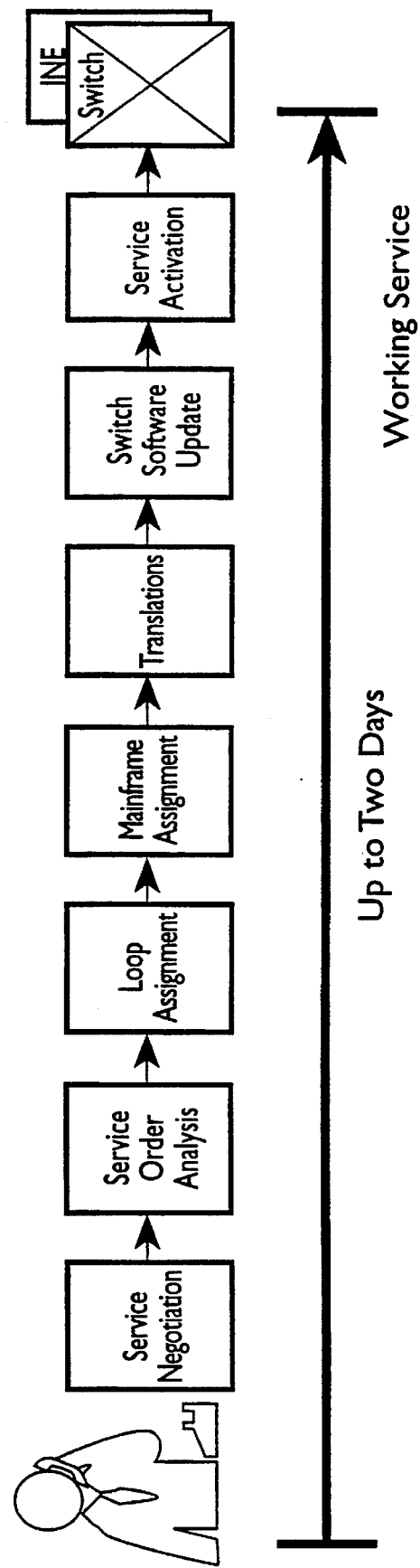
FIG. 2 is a simplified block diagram showing current (prior art) Public Switched Telephone Network (PSTN) provisioning.
Figure 5:
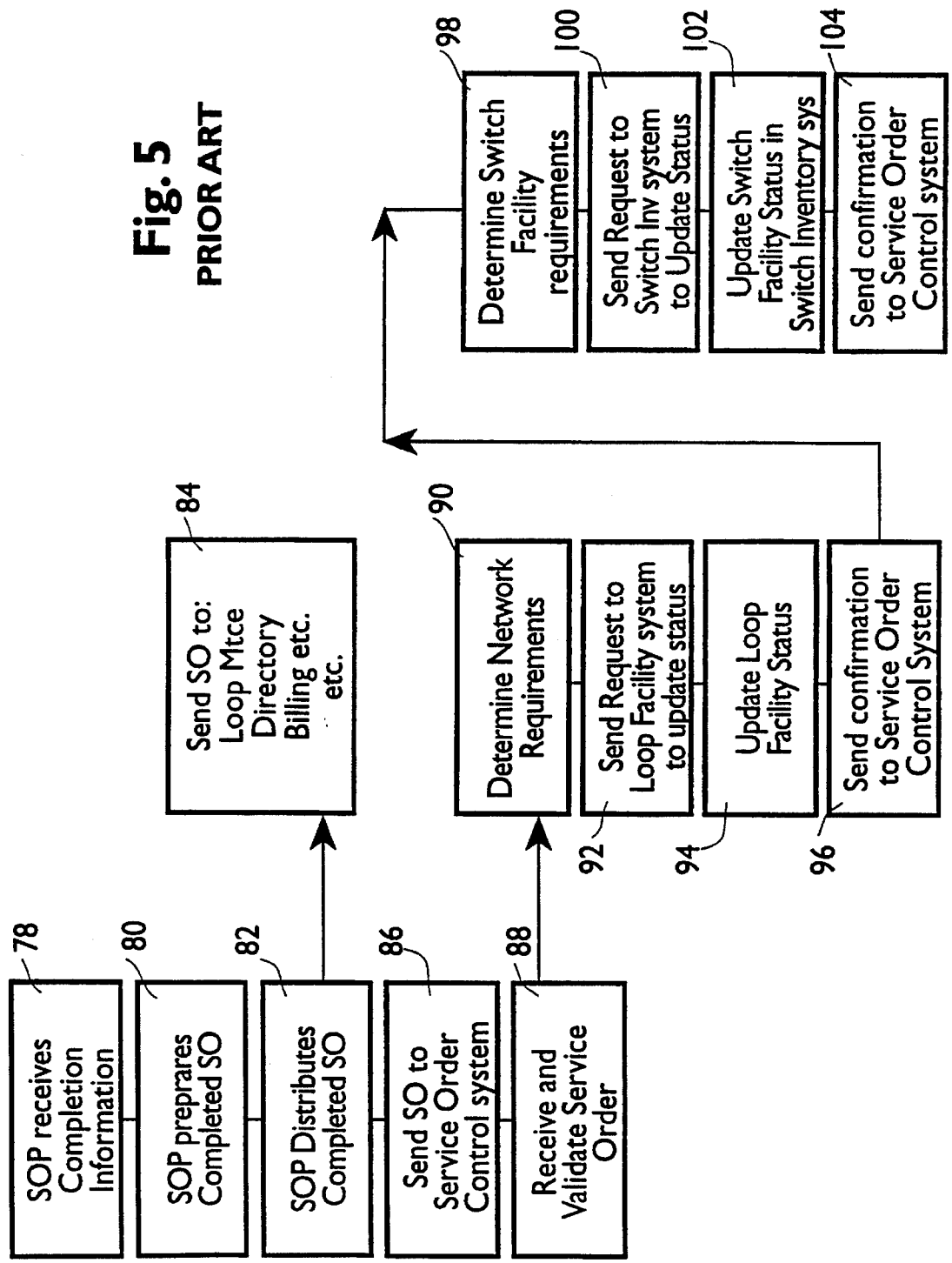
Figure 6:
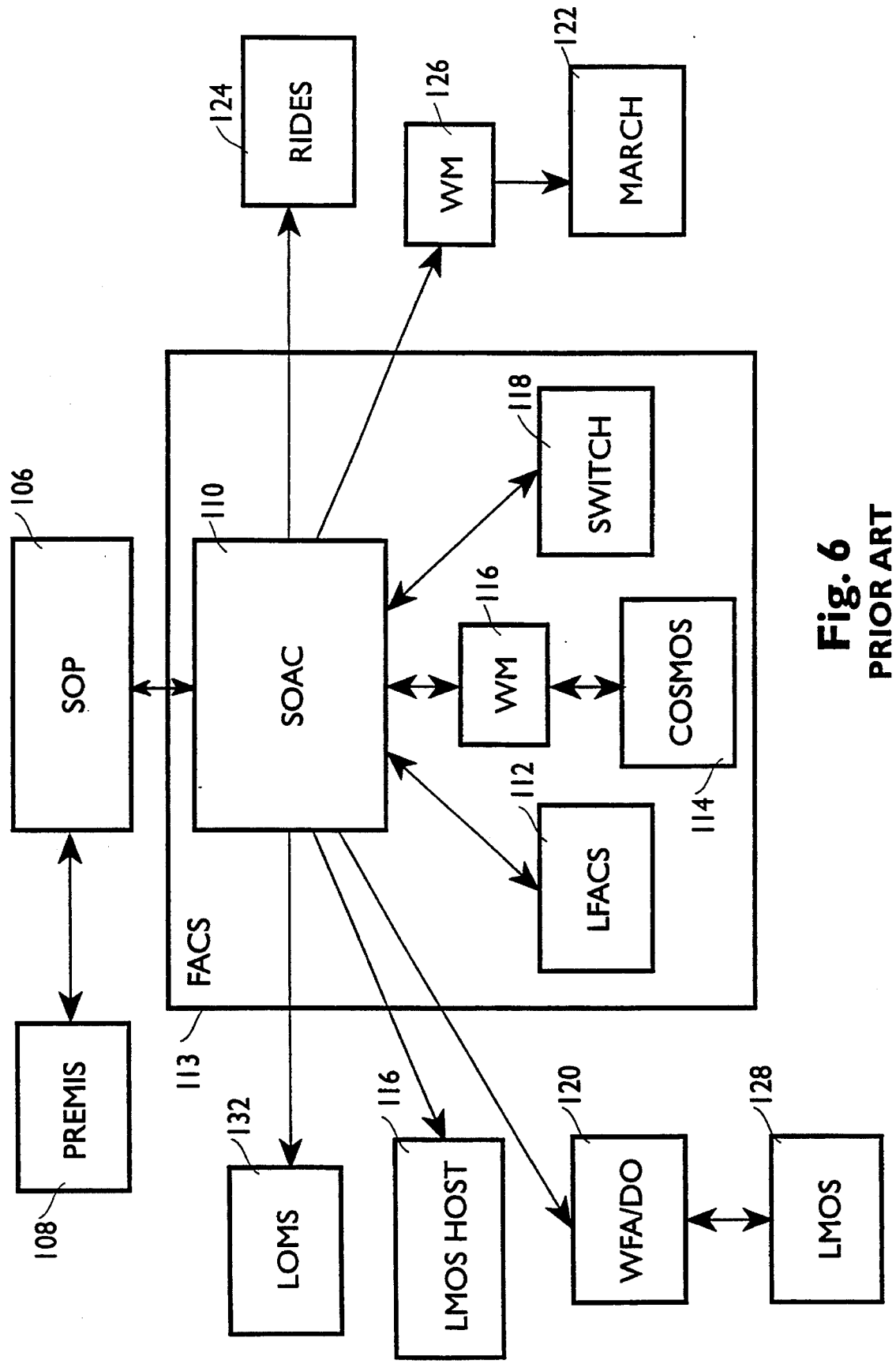
FIG. 6 is a block diagram illustrating the architecture of the current (prior art) PSTN administration system.
Figure 9:
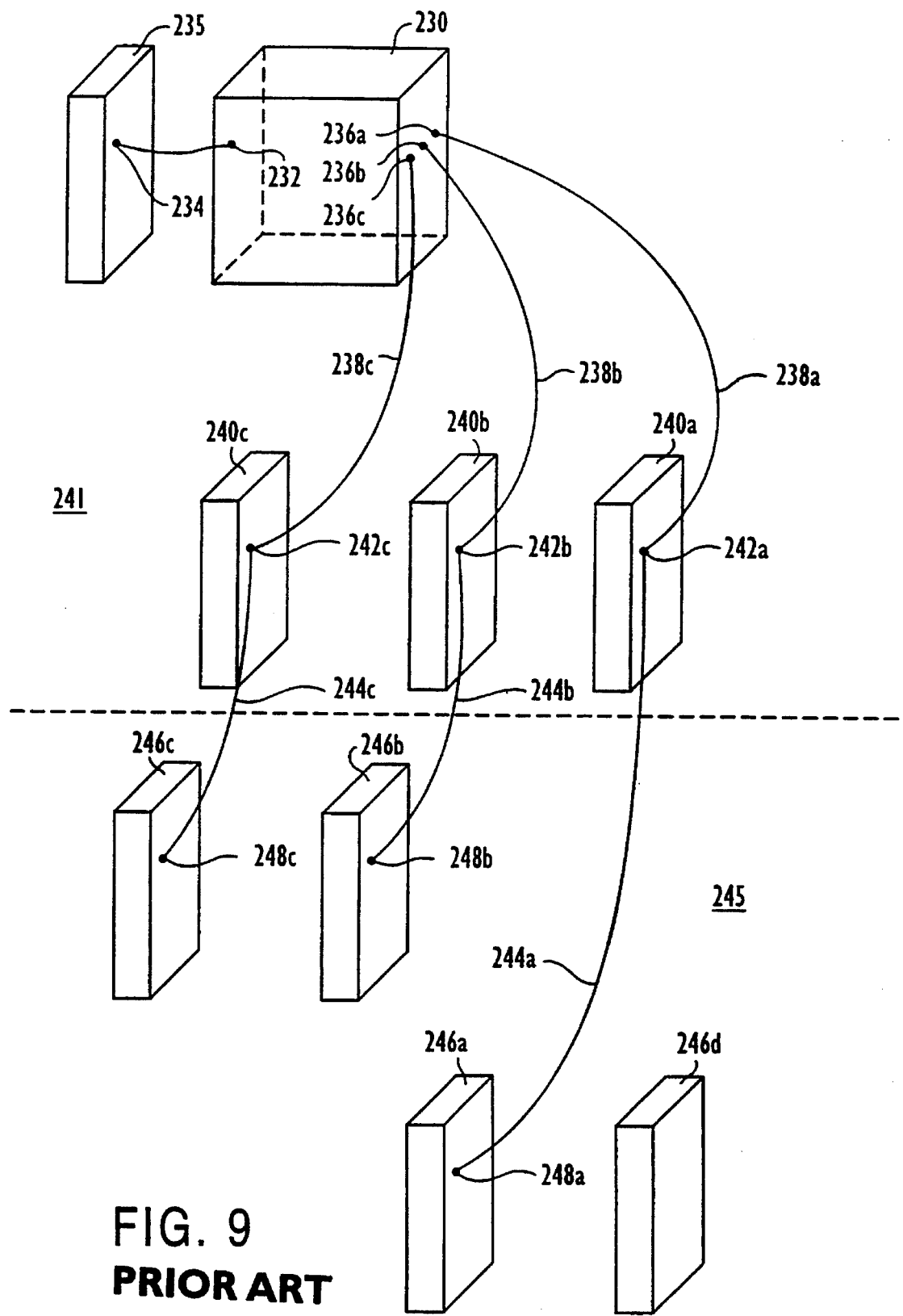
FIG. 9 is a detailed diagram (prior art) of office equipment facilities for a first combination of customer locations.
Figure 10:
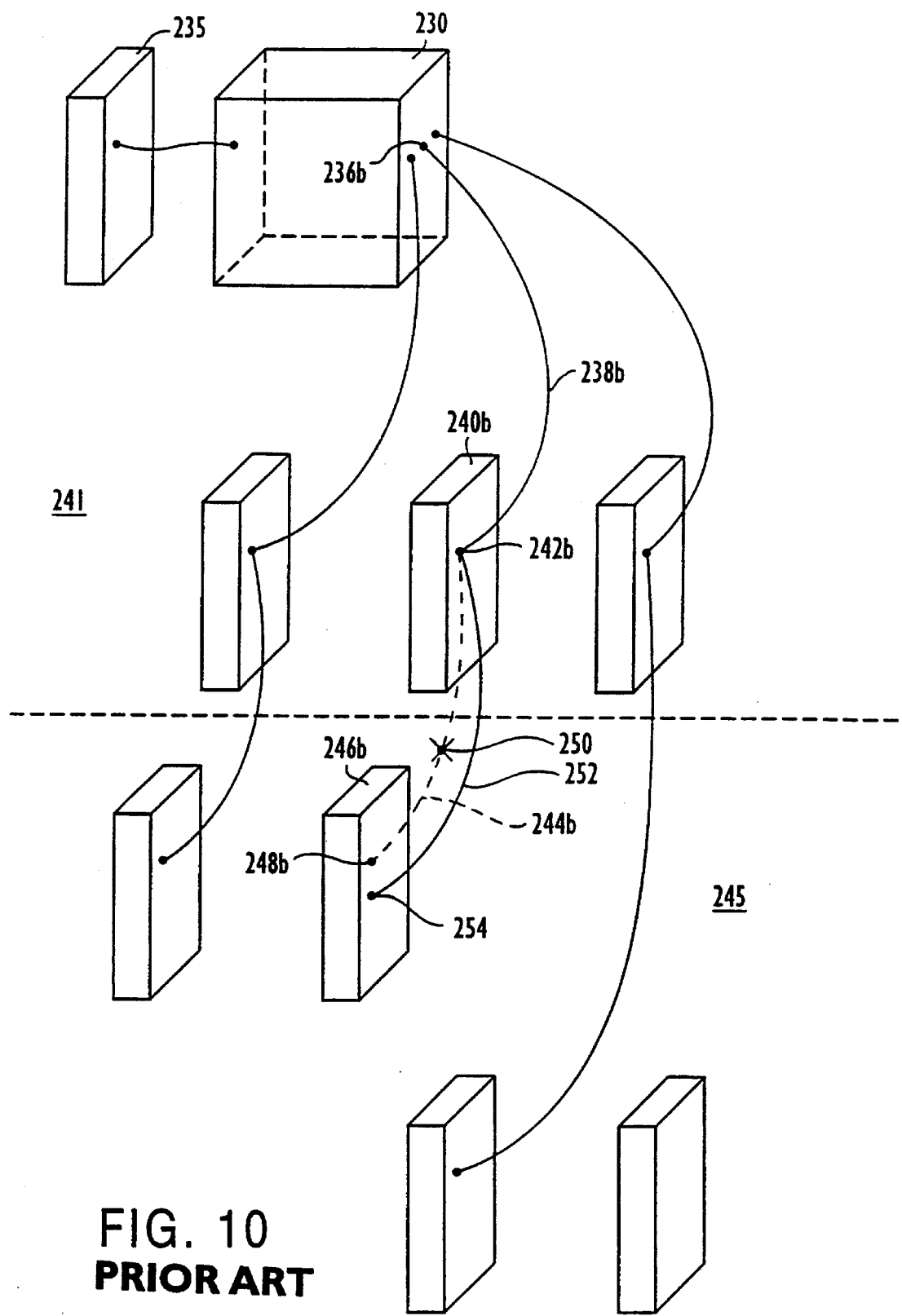
FIG. 10 is a detailed diagram (prior art) of office equipment facilities for a second combination of customer locations which has altered the first combination of customer locations.
Figure 11:
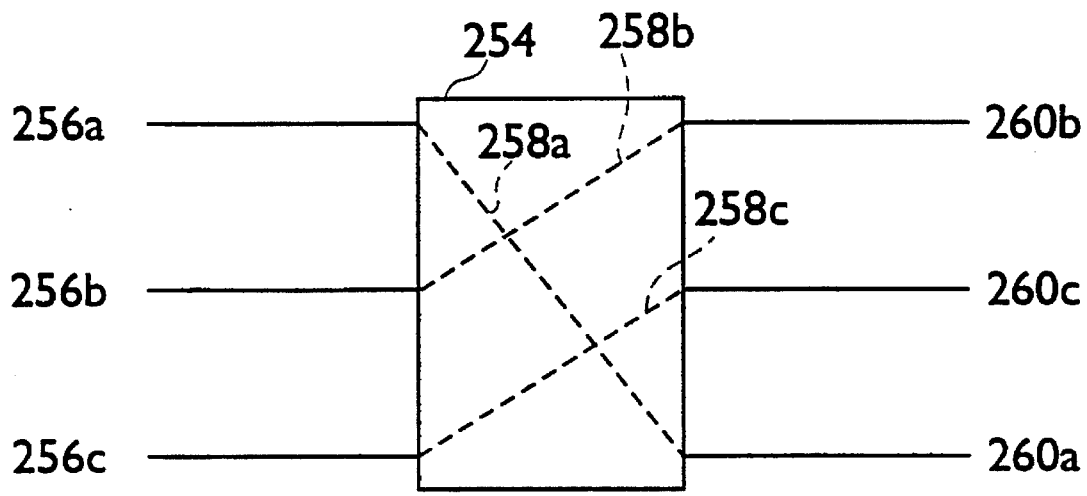
FIG. 11 is a detailed diagram (prior art) of office equipment facilities for a first combination of customer locations illustrating inefficient use of jumper cables.
Figure 12:
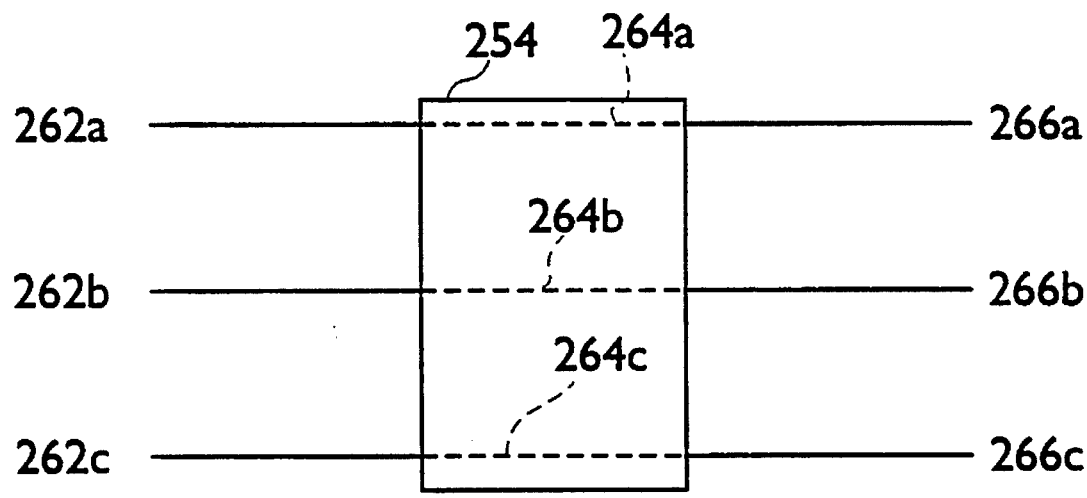
FIG. 12 is a detailed diagram (prior art) of office equipment facilities for a first combination of customer locations illustrating efficient use of jumper cables by altering existing central office facilities.

At 154 the customer's credit history is checked using internal and external data sources. Through this step at 154 the process has been the same as that described in the current system illustrated in FIGS. 2 and 5. At 156 the service representative takes the customer service address information provided and uses the adjunct processor referred to as "RTS" 136 in FIG. 13 to verify the address, determine the working status of the address and determine the serving wire center and other common address information such as community and tax codes. Based on the wire center serving the customer, the service representative is able to determine what services are available to the customer.

At 158 the Assignment Section Information is retrieved from RTS including the network address such as cable, pair, binding post, time slot identification, etc. From this information a determination can be made whether the address is RTS eligible, what services may be offered to the customer, and whether the requested service may be provided over the existing network.

Figure 3:
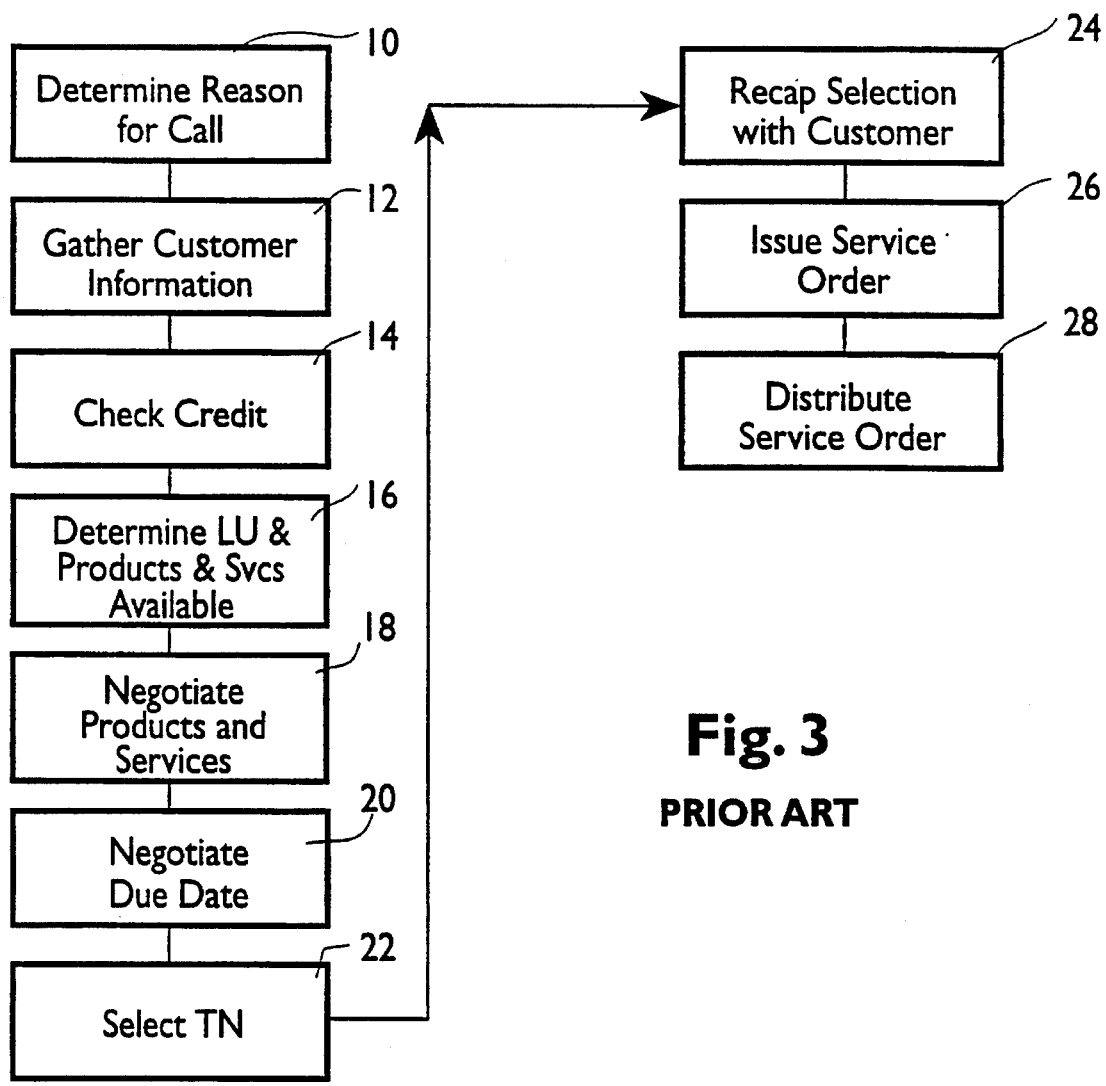
FIGS. 3, 4 and 5 are flow-charts illustrating current (prior art) service activation flow.
Figure 4:
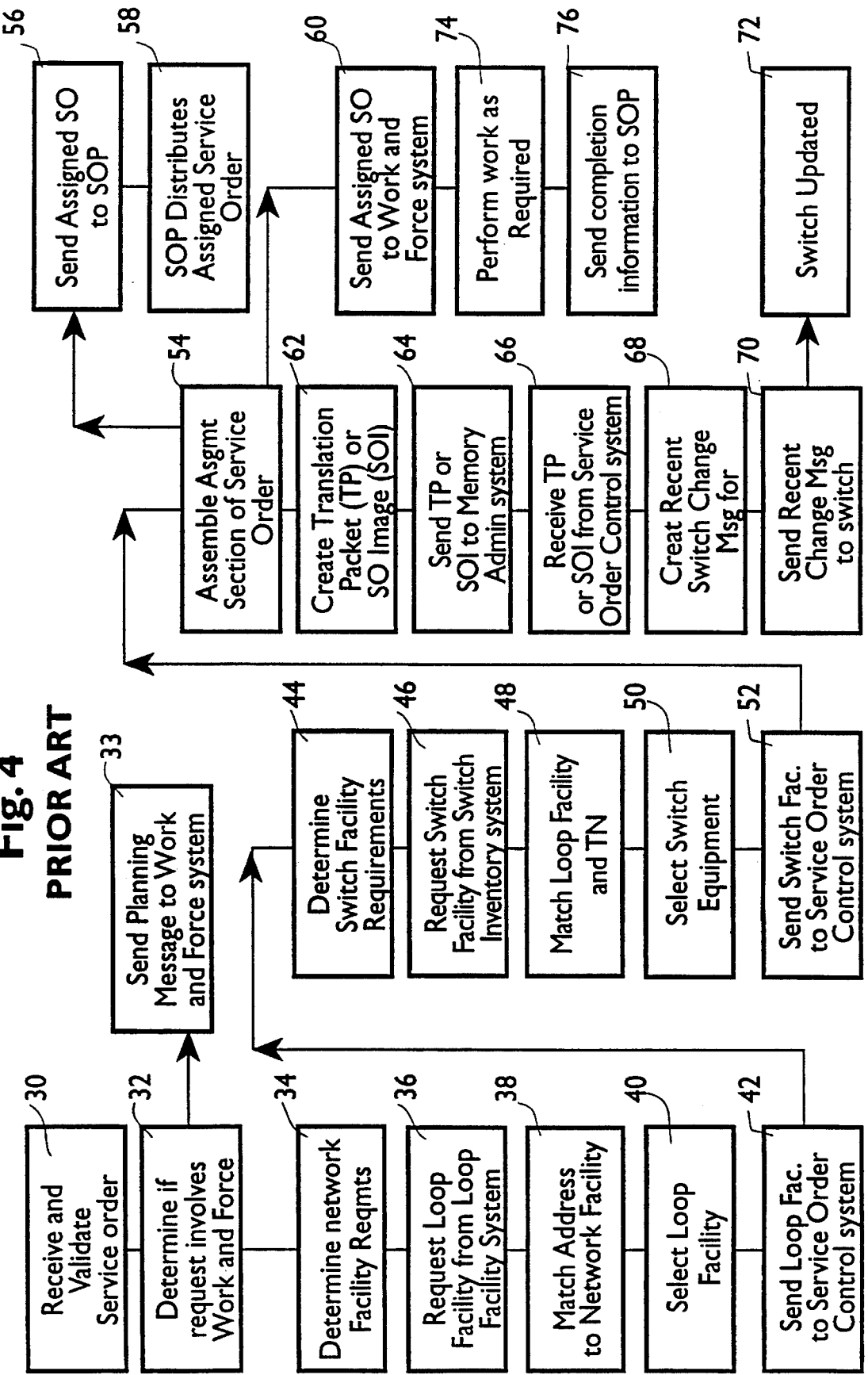

At 160 service is negotiated with the customer, matching the customer needs with the available services as at 18 in FIG. 3. At 162 the installation time is scheduled and due date for service negotiated as in step 20 in FIG. 3.

At 164 the selection of Telephone Number is now made from RTS which contains all TNs and also assists in administration of those numbers. Administration of TNs includes the categories, status and availability of the TN. This TN is based on the wire center serving the area and the availability of the TN. RTS supports the selection of a preferred or special TN by the customer.

At 166 the service representative recaps the service request to insure that the customer order accurately reflects the customer requirements as in step 24 in FIG. 3.

At 168 a determination is made to identify the service request as RTS eligible. This eligibility is based on the address being served, the status of network facilities and the services requested. If the service request is RTS eligible, the request is sent to RTS 136 in FIG. 13 for processing. If the service request is not RTS eligible, the request may be processed in the current service activation process environment. This is indicated at 170 where a conventional service order is issued followed by the remainder of the current service order processing steps.

If the service request can be processed by RTS it is received by RTS at 172 in FIG. 14. The service request is received by RTS and validated and checked for format accuracy and RTS eligibility at 174 in FIG. 15. At 176 RTS places the service request in a log for further use and identification. This permits a check of the status of the request at any point during RTS processing.

At 178 RTS associates service request types as appropriate before processing them through the RTS environment.

This includes but is not limited to: sequencing "in" and "out" service requests, associating corrected service requests with the original request or processing supplemental changes of a service request in process. At 180 a determination is made as to where the request needs to be processed and in what sequence. Processing includes the Memory Administration System (MAS) that must receive an activation message based on the requested products and services. A determination is also made as to whether or not a dispatch or test is required.

If a dispatch or a test is required a message is created and sent to the Work and Force system at 182. This message includes all necessary information to complete the work request including assignment data. If other work in the field or in the central office is required this is completed and reported back to the appropriate center or system as indicated at 184.

At 180 RTS also determines if a Memory Administration System (MAS) is involved in the request and, if so, determines if it has the required information to prepare a translation packet to send to the MAS. The translation packet (TP) is then created and sent to the MAS. The TP is received and validated in the Memory Administration System and the MAS determines what needs to be done to complete the request. The MAS creates a machine readable message (RC message) specific to the switch to receive the message. The Recent Change (RC) message is created to match the vendor's specific switch type and generic at 186. If the RC message is accepted by the switch, the switch updates the information associated with the switch equipment and telephone number on the RC message at 188.

When the Work and Force system completes a job a completion confirmation is dispatched to the RTS from the Work and Force system and from the Memory Administration System and RTS then updates the inventory facilities, telephone numbers and LU addresses at 190 to reflect the completed service request. The Service Request Order Trail is updated when each task associated with a service request is completed. When all tasks associated with a service request have been completed in the RTS processing environment, completion information is formatted for transmission to the service order processor at 192.

After completion of the service request the completion information is sent to the SOP at 194. This information may include the completion time and date, any changes to the service order and any billing information that needs added time and material charges. At 196 the SOP receives the completion information and prepares the completed service order for distribution and determines the distribution list. The completed service order is then distributed to all systems requiring the information.

As a result of the new system and method it is possible to reduce the time between request and activation of service from up to two days to a matter of minutes. In many instances it is possible to activate the service prior to ending the service request call. As a result of the new system and method it is possible to reduce the operating cost of provisioning business functions such as Install Inside and Install Outside, increase the reliability of providing on time, error-free service by reducing the number of orders that require manual assistance thereby increasing the flexibility of the provisioning process to support the activation of a new product or service quickly and inexpensively, enhance customer services and customer retention by providing faster access to all products and services, and provide a strong long-term information infra structure that meets the needs of the existing products and provides a foundation that can handle the requirements of new products.

In addition, the new system and method support SSNS negotiation by providing information that is currently provided by PREMIS. RTS provides telephone numbers for selection, address verification and suggestions, and RTS eligibility information. RTS stores and maintains all address information including common and living unit address information for both business and residential addresses. All telephone numbers are selected from RTS. However, the administration (classification and maintenance of status) of telephone numbers are split. RTS administers all residential telephone numbers and COSMOS continues to administer business telephone numbers. RTS does not provision facilities but instead maintains the status of a fixed assembly from the central office to the living unit. As service requests are processed by RTS the facilities remain fixed and only the customer information and services are updated. RTS creates activation messages for other MARCH and other memory administration systems, such as VMAP (Voice Mail Adjunct Processor) and MSP (Multi-Services Platform), required to produce recent change messages which update switch memory.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

GLOSSARY/ACRONYMS

AHN—Assigned House Number—Used to identify living units in provisioning systems for non-addressed areas.

AIN—Advanced Intelligent Network.

AIRS—Automatic Inventory Record System—A system used to create and maintain telephone numbers. This system is being replaced by COSMOS.

AR—Assignment Request—Message sent from SOAC to LFACS to request an outside loop facility. Also sent from SOAC to COSMOS requesting an inside central office facility.

ARR—Assignment Request Response—The message sent in response to the Assignment Request from LFACS and COSMOS.

ASTR—Automatic Suspension Termination Restoral— ASTR generates requests to terminate or restore residential service for nonpayment.

ARS—Automated Records System—Engineering design system.

CUS—CUstomer Service System—billing system.

SOP/DOE—Service Order Processor/Direct Order Entry.

BOSS—Billing Order Support System—Used by Residence and Business Service Centers to assist service representatives with billing inquiries and services. Interfaces with CRIS and provides: 1) current monthly bill; 2) previous bill; 3) payments; 4) audit trail of account history (i.e., payment arrangements, discussions regarding service, record of contacts).

BSC—Business Service Center.

CCF—Custom Calling Feature—Defines a particular feature which is part of a customer's service. It can be identified by either a USOC or a FID.

CDDS—Customer Director Delivery System.

CF—Connected Facilities—A provisioning description of a facility that connects cable and pair from the central office to the living unit but is not considered the primary service.

CLASS—Custom Local Area Signaling Service—CLASS services including Caller ID, Repeat Call, Return Call, Call Block and Call Trace.

CNF—Connected Facility—A CNF's loop is a nonworking loop that has continuity between the LU and either the Central Office or a Remote Switching Unit. It does not qualify for CT administration but is given preference for assignment at a living unit over spare facilities.

COF—Central Office Facilities.

COSMOS—COmputer System for Mainframe Operations Manages the central office facility inventory including OE and TNs.

CP—Cable Pair.

CRIS—Customer Records Information System—The billing system for exchange services.

Cross-connect—A cross-connect refers to either a physical jumper cable or an electronic connection which connects two cable pair segments together. For example, a specific F1 cable pair may be cross-connected to a F2 cable pair via a jumper cable in a serving terminal. Cross-connects allow flexibility in the manner that a specific loop is assembled.

CRSAB—Centralized Repair Service Answering Bureau The unit that accepts customer trouble calls, performs cursory testing and passes information to Installation and Maintenance.

CSOP—Common Service Order Processor—Translates service request from SSNS into service order format and reverse.

CT—Connect-Through—A CT'd loop is a non-working loop that has continuity between the living unit (LU) and either the Central Office or a Remote Switching Unit and is designated as CT. LFACS only creates one CT per living unit and it receives preferential status for further assignment at that living unit.

Customer Contact—The business functions performed by representatives of the residence Service Centers or Residence Collection Centers to meet the needs of customers.

DD—Due Date—The date in which a customer's request is scheduled to be completed.

DIP—Dedicated Inside Plant—A DIP refers to a jumper cable which is not removed when services is disconnected. A DIP is created so that the jumper cable may be reused when service is reestablished at the same living unit, thereby saving the manual labor cost required to replace the jumper cable. The "DIP'd" jumper cable will receive a status of "left-in", or LI. COSMOS will create and break DIPs based on preset parameters.

DON—Delayed Order Notice—Message indicating that a service request will be delayed because of the lack of facilities.

DNP—Disconnect for Non-Payment.

DSDC—Distribution Services Design Center—Work group responsible for designs of the outside facilities, also responsible for entering new address and inventory data into LFACS, COSMOS and PREMIS.

DSPC—Distribution Services Planning Center—Monitors the state of the current facilities in order to plan for the creation of new facilities.

EAMI—Exchange Access Mechanized Input system—A batch process (tape) of customer accounts who have selected specific inter-exchange carriers to be their long distance provider. Data is used to update the CRIS billing systems and the switch.

ESOI—Error Service Order Image—Message sent from SOAC to the SOP if the service order fails defined edits or other conditions.

ET—Enhanced Teams—A uniform call distribution network that evenly distributes customer calls to appropriate RSCs and BSCs.

EWO—Engineering Work Order—Work request to modify network facilities, created by engineering and sent to construction for network modifications.

FA—Facility Address.

FACS—Facilities Assignment and Control System Includes SOAC, LFACS, COSMOS, LOMS and WM.

FCC—Frame Control Center—Work group responsible for the coordination of inside network facility activities such as placing jumpers between OE and the F1 cable pair.

FCIF—Flexible Computer Interface Format—A data interface language that can be used to exchange data (messages) between two applications/processes. The FCIF language is independent of the communication protocol. It is the current Bellcore standard for defining OS-to-OS interfaces.

FID—Field IDentifier—Used on service orders that indicates more data will follow. A label on a service order that prefaces service order information. FIDs are alpha or alphanumeric codes that identify retained information on an account, indicate physical or record activity, generate or negate non-recurring charges, specify recurring charges, document work done by various departments and identify facilities used to provide service.

FIDO—Fast Input Directory Order (system)—A computer system used by Service Representatives to order secondary or foreign telephone directories (directories outside of the customer's calling area).

First Net Order—A pending service order that is in its original state, as created by the Service Representative.

FITL—Fiber in the Loop.

F1, F2, F3, etc. cable pair—The F1 cable pair is the first segment of cable which comprises the outside plant loop. The F1 originates in the central office and terminates at a distribution terminal or serving terminal. In the case where a customer is served beyond the distribution terminal this is referred to as the "feeder" pair.

The F2 cable pair is the second segment of cable in the outside plant loop facility. The F2 originates at the distribution terminal where the F1 cable pair ends and will normally terminate at the serving terminal. The F2 pair is sometimes referred to as the "distribution" pair.

There are cases where the loop may be assembled from more than two sets of facilities (F1 and F2) these would be referred to as F3, F4, etc.

FMO—Future Method of Operation—The manner in which functions and processes will be performed in the future.

FOM—FACS Operations Management—Centralized work group involved in resolving RMAs that cannot be resolved by the local centers.

FX—Foreign Exchange—Assignment of a telephone number and local calling area that differs from the customer's serving wire center.

GSG—Geographic Site Guide.

GUI—Graphical User Interface.

ICC—Installation Control Center, work center involved with the dispatch of outside technicians and the management of service requests involving outside network work or customer wiring work.

IISA—Integrated Information Systems Architecture.

I&M—installation and Maintenance—The work group responsible for scheduling and performing installation and maintenance activities. This work can be performed anywhere from the customer premise to the central office.

IMOSS—ISDN Marketing and Operations Support System.

Interchangeable Exchange—A group of NXXs that offer identical services and calling areas within a given wire center and are available for telephone number assignment.

ISCP—Integrated Service Control Point—Network element in the AIN network.

IXC—Inter-exchange Carrier—A carrier authorized by the Federal Communications Commission (FCC) to provide interLATA, interstate and/or international long distance communications services; a carrier authorized by a state Public Utility Commission (PUC) to provide long distance communications service but not local exchange service within state boundaries. Also referred to as "IC", "IEC", or "IXC".

LA—Listed Address—Appears in the LST section of the service order to identify a telephone service as appearing in the White Pages directory, with Director Assistance or on company records only. The List Address is not necessarily the physical location of the service.

LAC—Loop Assignment Center—Same as MLAC, normally referred to an MLAC after the center has been converted to FACS.

LATA—Local Access and Transport Area.

LCC—Line Class Code—Identifies to the switch a particular class of service. It can be identified by a USOC, FID, or some combination of the two. The FID would modify the USOC by qualifying the class of service with specific attributes such as 700/900 blocking.

LDM—Logical Data Model.

LEIS—Loop Engineering Information System—Operations system used by the DSDC to monitor the outside plant network for network modifications of growth.

LET—Line Equipment Transfer—The transfer of central office line equipment to support area transfers or load balancing.

LFACS—Loop Facility Assignment and Control System A member of the FACS (Facilities and Assignment Control System) family of applications, LFACS is a Bellcore designed system that inventories and assigns all loop facilities from a customer's premises to the main distributing frame in the central office.

LI—Left-In, status given to jumpers in the central office connecting the F1 cable pair with an OE.

LMOS—Loop Maintenance Operations System—An AT&T developed system used to maintain line records and identify network troubles.

LOMS—LAC Operations Management System—Services orders that do not automatically flow through the provisioning process "fall out" of automatic processing and are managed by LOMS. LOMS assists the MLAC in management of RMAs (Requests for Manual Assistance).

LST—Line and Station Transfer—Rearrangement of outside network facilities to support service activation.

LU—Living Unit—The exact physical location of phone service (i.e., house, business, garage, apartment, etc.). Living Unit information is stored in PREMIS.

MCRF—Mechanized Credit Reference File. A system used by C&P for credit verification. It will be discontinued and replaced with the more robust SSRDF.

MISOS/DOE—Minimal Input Service Order System/Direct Order Entry—The Service Order Processor used by New Jersey Bell.

MLAC—Mechanized Loop Assignment Center—The MLAC is responsible for the administration of service orders through the provisioning process. Service orders which cannot automatically flow through the provisioning systems are resolved at the MLAC.

MLHG—Multi-Line Hunt Group.

MSP—Multi Services Platform—Operations system used to support the Ultra-Forward service, also designed to support other new services needing switch updates.

MVP—Multi-Variety Package—Centrex service for residential and small business customers.

NAC—Network Administration Center—The NAC is responsible for monitoring and administering operations on the central office switches. This includes monitoring the availability of OE and ensuring that the switches are properly load balanced.

The NAC is also responsible for telephone number administration. This includes the management of TN inventory and the distribution of TNs to the BSC or RSC for assignment.

NID—Network Interface Device—The NID serves as the interface between outside plant facilities and the living unit (LU). This is also referred to as the "point of demarcation". This is on the customer's side of the network and protector.

NPA—Numbering Plan Area—The area code of the telephone number. For example, in the number (703) 555-1367, 703 is the NPA.

NXX—Also known as the NNX—The telephone number exchange. For example, in the number (703) 555-1367, 555 is the exchange.

OE—Office Equipment—The office equipment is the switch port that is used to connect the F1 cable pair with the switch. It is the physical hardware within the central office that provides originating and terminating call functionality. It includes line terminations, signaling (including dial-tone) and supervision and call completion.

OM—Order Manager—Operations support system that supports implementation of SDT in the current environment by modifying service order to create or disconnect the SDT line. Other implementations of the OM have created a second order to perform this function.

OSCA—Open Systems Computing Architecture—Addresses the way systems should be constructed for data independencies and optimum modularity.

OSP—Outside Plant—Include the cable pair segments, terminals and cross connects which are combined to create a complete outside loop. This outside loop connects a customer living unit with a central office serving the customer.

PCF—Partially Connected Facility—A PCF'd facility is a non-working loop that is connected to a living unit but is not connected completely back to the Central Office or a Remote Switching Unit.

PIC—Primary Interexchange Carrier—A FID in the Service and Equipment section of the service order that describes the long distance carrier selected to carry interLATA, interstate and/or international toll traffic for a customer.

PICX—The unique three character code that denotes an inter-exchange carrier selected by the customer.

POTS—Plain Old Telephone Service—Basic telephone service for the transmission of human speech.

PREMIS—Premise Information System—A Bellcore developed stand-alone component of FACS. PREMIS provides interactive support to RSCs, and BSCs, and Loop Assignment Centers. For the RSCs and BSCs, PREMIS offers: address verification, SAG and Living Unit information, negotiation aid, commitment dates, service order assistance, telephone number assignment, credit information, interexchange carrier selection.

PREMIS Maintenance Center (PMC)—The work group responsible for updating the PREMIS system.

PMO—Present Method of Operation—The manner in which functions and processes are performed today. Current Environment.

PTN—Preferred Telephone Number—A special telephone number selected by the customer; or a telephone number selected by the NAC to fulfill a customer's request for an easy number. (Easy TNs are described as those numbers that have at least two of the same number in the extension.)

PUC—Public Utility Commission—The governing body in each state that sets, changes, and removes restrictions and regulations on utility companies. The PUC is in place to protect consumer's interests.

RAO—Revenue Accounting Office—A unit that administers payment management and billing systems support.

RBOC—Regional Bell Operating Company.

RCC—Residence Collection Center—A unit that manages billing and collections activities. Collection agents work in the RCCs. Each company has multiple RSCs spread throughout its territory.

RCMAC—Recent Change Memory Administration Center Work group responsible for memory administration changes to the central office switch.

Recap—On change orders and restorals, the process by which the service order processor will place the non-changing features and services on the service order based on information stored in the customer record in CRIS. Also, the business function performed by the Service Representative to ensure that the customer order was accurately recorded.

RFACCS—Regional Final Accounts Credit and Collections System—A system used by the RCCs to manage final account billing and collections. Used to verify credit.

RIDES—Remote Intelligent Distribution Element Support—Support system for activation of fiber network elements in the loop.

RIDS—An acronym for the SSNS process that will search for Restrictions, Incompatibilities, or Dependencies with basic, toll, and optional services selected by a customer.

RMAS—Remote Memory Administration System—Support system for creating recent change messages and interacting with the central office switch for line memory changes.

RSC—Residence Service Center—A unit that provides customers with entree to the Telco. The RSCs handle inquiries, complaints, requests for service and billing and payment assistance. Service Representatives work in the RSCs. Each company has multiple RSCs spread throughout its territory.

RTS—Ready-to-Serve—The concept in which facilities are stabilized and dedicated to living units in order to provide service to the customer when requested.

SA—Service Address—A FID in the LST section of the service order that describes the physical location of the service.

SAG—Street Address Guide—Defines parameters for defining a customer's service, including but not limited to NPA, NXX, wire center, rate zone, and terminating traffic area. SAG information is stored in PREMIS.

SalesCue—A subset of SSNS, SalesCue assists reps by recommending products and services to sell to customers based on demographics and life-style clues obtained during the contact.

SDT—Soft Dial Tone—Restricted dial tone that is placed on the customers line that provide restricted calling to the business office to place service orders and to 911 for emergencies.

Second Net Order—A pending service order that has been through the provisioning process and has facilities assigned.

Service on Demand—The concept which provides service to the customer on the date that he requests. Also referred to as "When do you Want it" service.

SOAC—Service Order Analysis and Control—The controller portion of the FACS family of systems.

SOACS—Service Order Administration and Control System —The Service Order Processor used by C&P Telephone.

SOI—Service Order Image—Orders which SOAC determines will require manual intervention in MARCH are sent as order images, including all data on the service order.

SOP—Service Order Processor (Generic)—A system for creating, editing and distributing service orders to downstream processes and systems.

SOP/DOE—Service Order Procedure/Direct Order Entry.

SSNS—SalesService Negotiation System—A graphical user interface system that presents information to service representatives from a variety of systems and platforms in a window format to assist negotiation of services and inquiries.

SSRDF—Social Security/Repetitive Debt File—A credit verification system.

TCAT—Telephone Number Category—A three character code describing the overall service that the customer will receive. Used during TN selection with PREMIS.

Third Net Order—An order that has been through the provisioning and memory administration processes. Often referred to as a "completed" order.

TN—Telephone Number—A ten digit number comprised of an area code (NPA), an exchange (NXX), and an extension.

TP—Translation Packet—SOAC creates TPs from the service order it receives from the service order processor. SOAC checks the USOCs/FIDs, determines that the order should flow through MARCH, strips the memory administration codes off the order, and formats the TPs which it send to MARCH.

TQM—Total Quality Management.

ULBB—User Layer Building Block—For example, the presentation layer of SSNS that service reps use.

USOC—Universal Service Order Code—An alphanumeric coding scheme that identifies products and services that have been ordered by a customer.

VMAP—Voice Mail Adjunct Processor.

VOD—Video On Demand.

WDYWI—When Do You Want It—Service on Demand.

WFA/DO—Work and Force Administration/Dispatch Out
WFA/DO is responsible for determining the need for dispatching, scheduling the dispatch, and managing of jobs for service orders which require a dispatch. This includes both outside plant installation and customer premises work.

WM—Work Manager—Operations system that manages data traffic between SOAC and COSMOS and between SOAC and MARCH.

We claim:

1. An administration system for a public switched telephone network (PSTN), comprising:

a first automatic service order processing system which receives a service request from a customer requesting service and stores first customer facility data in a first database associated therewith, when the service request is eligible for processing by said first automatic service order processing system, said first automatic service order processing system automatically provisions first customer facilities to execute the service request based upon the first customer facility data, and the first customer facility data maintained by the first automatic service order processing system without being altered when a disconnect request is received from the customer, and when the service request is not eligible for processing by said first automatic service order processing system, said first automatic service order processing system generates a provisioning request to process the service request; and a second automatic service order processing system operatively connected to said first automatic service order processing system and storing second customer facility data in a second database associated therewith, said second automatic service order processing system receiving the provisioning request from said first automatic service order processing system and automatically provisioning second customer facilities to execute the service request, said second automatic service order processing system not being required to reassign the first customer facilities as the second customer facilities when a disconnect request is received from the customer.

2. An administration system for a public switched telephone network (PSTN), comprising:

first means for receiving a service request from a customer requesting service and storing first customer facility data in a first database associated therewith, when the service request is eligible for processing by said first automatic service order processing system, said first means automatically provisions first customer facilities to execute the service request based upon the first customer facility data, and the first customer facility data maintained by said first means without being altered when a disconnect request is received from the customer, and when the service request is not eligible for processing by said first automatic service order processing system, said first means generating a provisioning request requesting processing of the service request; and second means for storing second customer facility data in a second database associated therewith, for receiving the provisioning request from said first means and automatically provisioning second customer facilities to execute the service request, said second means not being required to reassign the first customer facilities as the second customer facilities when a disconnect request is received from the customer.

3. In an administration system for a public switched telephone network (PSTN) including an attendant station for receiving service requests, a method comprising the steps of:

receiving a service request corresponding to a living unit from a customer requesting service;

determining whether the service request corresponding to the living unit is eligible for provisioning using prior customer facility data previously assigned to the living unit;

when the service request is eligible for provisioning using prior customer facilities previously utilized by the living unit, automatically provisioning the prior customer facilities to execute the service request based upon the prior customer facility data maintained without being altered when a disconnect request is received from the customer;

when the service request is not eligible for provisioning using the prior customer facilities previously utilized by the living unit, generating a provisioning request requesting processing of the service request;

automatically provisioning other customer facilities to execute the service request, responsive to the provisioning request, based upon one of the prior customer facility data and new customer facility data.

4. In an administration system for a public switched telephone network (PSTN) including an attendant station for receiving service requests, a method comprising the steps of:

receiving a service request from a customer at a living unit requesting service;

determining whether the living unit had previously been equipped with prior customer facilities for service;

when the living unit had not been previously equipped with the prior customer facilities, automatically provisioning customer equipment to execute the service request based upon customer facility data that is maintained without being altered when a subsequent disconnect request is received from the customer;

when the living unit had been previously equipped with the prior customer facilities, determining whether the service request corresponding to the living unit is eligible for provisioning using the prior customer facilities previously utilized by the living unit; and when the service request is eligible for provisioning using the prior customer facilities previously utilized by the living unit, automatically provisioning the customer equipment to execute the service request based upon the prior customer facility data previously used at the living unit.

5. In an administration system for a public switched telephone network (PSTN), the method according to claim 4, further comprising the steps of:

when the service request is not eligible for provisioning the customer facilities previously utilized by the living unit, generating a provisioning request requesting processing of the service request; and automatically provisioning other customer equipment to execute the service request, responsive to the provisioning request, based upon one of the prior customer facilities and new customer facilities.

6. In an administration system for a public switched telephone network (PSTN), the method according to claim 5, wherein the automatically provisioning step further comprises the step of optimizing the provisioning of the other customer equipment with respect to at least one of facility location, reuse of facilities, facility cost, and facility efficiency which determines whether the one of the prior customer facilities and the new customer facilities are selected for the other customer equipment.

7. An administration system for a public switched telephone network (PSTN), comprising:

means for receiving a service request from a customer at a living unit requesting service;

means for determining whether the living unit had previously been equipped with prior customer equipment for service;

means for automatically provisioning customer equipment to execute the service request using customer facility data when the living unit had not been previously equipped with the prior customer equipment, and the customer facility data maintained without being altered when a subsequent disconnect request is received from the customer;

means for determining whether the service request corresponding to the living unit is eligible for provisioning the prior customer equipment previously utilized by the living unit; and means for automatically provisioning the prior customer equipment to execute the service request when the service request is eligible.

8. An administration system for a public switched telephone network (PSTN) comprising an attendant station for receiving service requests and collecting customer information; a first service order processing system; service order format means for formatting and distributing service orders for processing by said first service order processing system; and a second service order processing system having storage means for storing data including Living Unit (LU) data, customer facility data and Telephone Number (TN) data, said second service order processing system storing the LU data corresponding to the customer facility data as provisioned data for a LU, and for maintaining the provisioned data in said second service order processing system without altering the customer facility data when a disconnect request is received by the attendant station; said second service order processing system receiving data from said attendant station for determining whether the service request is eligible for processing by said second service order processing system and, if so performing the following:

selecting a TN from said second service order processing system and processing the service request by assigning the provisioned data maintained by said second service order processing system to the LU when a new service request is initiated by the LU even when a disconnect request has been previously requested by the LU;

determining whether Work and Force Administration (WFA) action is necessary for connecting outside plant facilities to the living unit, and when the WFA action is necessary, preparing and dispatching a message to a WFA center for performing the WFA action;

determining whether Memory Administration System (MAS) action is necessary, and when the MAS action is necessary, creating a Translation Packet (TP) and sending said TP to a MAS for performing the MAS action;

updating the customer facility data in response to confirmation of completion of said WFA action; and generating and dispatching a completion message to said service order format means.

9. An administration system for a public switched telephone network (PSTN) comprising an attendant station for receiving service requests and collecting customer information; a first service order processing system; service order format means for formatting and distributing service orders for processing by said first service order processing system; and a second service order processing system having storage means for storing data including Living Unit (LU) data, customer facility data and Telephone Number (TN) data, said second service order processing system storing the LU data corresponding to the customer facility data as provisioned data for a LU, and for maintaining the provisioned data in said second service order processing system without altering the customer facility data when a disconnect request is received by the attendant station; said second service order processing system receiving data from said attendant station for determining if the service request is eligible for processing by said second service order processing system and, if the service request is eligible for processing by said second service order processing system, processing said service request by assigning the provisioned data maintained by said second service order processing system to the LU when a new service request is initiated by the LU even when the disconnect request has been previously requested by the LU, and, if the service request is not eligible for processing by said second service order processing system, issuing a service order requesting processing of the service request, said service order being processed by said first service order processing system.

10. In an administration system for a public switched telephone network (PSTN) comprising an attendant station for receiving service requests and collecting customer information; service order format means for formatting and distributing service orders; and a service order processing system having storage means for storing data including Living Unit (LU) data, customer facility data and Telephone Number (TN) data, said service order processing system storing the LU data corresponding to the customer facility data as provisioned data for a LU, and for maintaining the provisioned data in said service order processing system without altering the customer facility data when a disconnect request is received by the attendant station, a method of processing the service request comprising the steps of:

receiving data from said attendant station for determining if the service request is eligible for processing by said service order processing system;

if the service request is eligible for processing by said service order processing system, processing the service request by assigning the provisioned data maintained by said service order processing system to the LU when a new service request is initiated by the LU.

* * * * *